US007998540B2

(12) United States Patent
Goulding et al.

(10) Patent No.: US 7,998,540 B2
(45) Date of Patent: Aug. 16, 2011

(54) SUBSTITUTED ANTHRACENES

(75) Inventors: Mark John Goulding, Ringwood (GB); Marcus Thompson, Bournemouth (GB); Warren Duffy, Southampton (GB); Martin Heeney, Southampton (GB); Iain McCulloch, Southampton (GB)

(73) Assignee: Merck Patent Gesellschaft mit Beschrankter Haftung, Darmstadt (DE)

( * ) Notice: Subject to any disclaimer, the term of this patent is extended or adjusted under 35 U.S.C. 154(b) by 215 days.

(21) Appl. No.: 10/563,759

(22) PCT Filed: Jun. 30, 2004

(86) PCT No.: PCT/EP2004/007089
§ 371 (c)(1),
(2), (4) Date: Jun. 9, 2006

(87) PCT Pub. No.: WO2005/005572
PCT Pub. Date: Jan. 20, 2005

(65) Prior Publication Data
US 2007/0014934 A1    Jan. 18, 2007

(30) Foreign Application Priority Data
Jul. 10, 2003    (EP) ..................... 03015731

(51) Int. Cl.
*C09K 19/32*    (2006.01)
*C09K 19/30*    (2006.01)
*C09K 19/34*    (2006.01)
*C09K 19/38*    (2006.01)
*C09K 19/58*    (2006.01)
*C07C 13/58*    (2006.01)
*H01L 51/50*    (2006.01)

(52) U.S. Cl. ............... 428/1.1; 252/299.61; 252/299.62; 252/299.63; 252/299.3; 552/571; 552/573; 552/574; 257/40

(58) Field of Classification Search ............. 252/299.01, 252/299.62, 299.1, 299.3, 299.61, 299.63; 428/1.1, 1.3, 690; 552/271, 273, 274; 585/26; 257/40
See application file for complete search history.

(56) References Cited

U.S. PATENT DOCUMENTS

| | | | |
|---|---|---|---|
| 4,500,459 A * | 2/1985 | Hotta et al. ................. | 552/210 |
| 4,786,709 A | 11/1988 | Iimura et al. | |
| 6,242,116 B1 * | 6/2001 | Tadashi et al. ............... | 428/690 |
| 6,492,557 B1 | 12/2002 | Ichimura et al. | |
| 6,495,274 B1 | 12/2002 | Ishibashi et al. | |
| 6,638,644 B2 * | 10/2003 | Zheng et al. ................ | 428/690 |
| 2003/0018097 A1 | 1/2003 | O'Neill et al. | |
| 2003/0082402 A1 * | 5/2003 | Zheng et al. ................ | 428/690 |
| 2003/0118749 A1 | 6/2003 | Wingen et al. | |
| 2004/0202891 A1 * | 10/2004 | Ishibashi et al. ............ | 428/690 |

FOREIGN PATENT DOCUMENTS

| | | | |
|---|---|---|---|
| DE | 102 27 449 A | | 1/2004 |
| EP | 1 090 911 A | | 4/2001 |
| JP | 2002-134276 | * | 5/2002 |

OTHER PUBLICATIONS

CA 68: 12754, 1967.*
CAPLUS 2002: 349431.*
CAPLUS 1951: 13837.*
CAPLUS 1970: 132369.*
Sinigersky et al., "Doped non-conjugated polymers with enhanced electrical conductivity, Iodine doping of a liquid rystal polymer", Macromol. Chem. Phys. 198, 919-925, 1997.*
Sinigersky et al., Synthesis and properties of anthracene containing polyethers, Macromol. Chem. Phys. 201, 1134-1140 ,2000.*
Power et al, "Synthesis of poly(anthra-9,10-quinone-2,6-diyl)", Chemical Communications (Cambridge) (1998), (8), 873-874.*
CAPLUS 2001: 449553.*

* cited by examiner

*Primary Examiner* — Shean C Wu
(74) *Attorney, Agent, or Firm* — Millen, White, Zelano & Branigan, P.C.

(57) ABSTRACT

The invention relates to novel 9- and/or 10-substituted anthracenes, to their use in liquid crystal, light-emitting or semiconducting materials and devices, in anisotropic polymers, optical, electrooptical, decorative, security, cosmetic, diagnostic, electric, electronic, charge transport, semiconductor, optical recording, electroluminescent, photoconductor or electrophotographic applications, and to liquid crystal, light-emitting and semiconducting materials, polymers and devices comprising them.

36 Claims, No Drawings

SUBSTITUTED ANTHRACENES

FIELD OF THE INVENTION

The invention relates to novel substituted anthracenes, to their use in liquid crystal, light-emitting or semiconducting materials and devices, in anisotropic polymers, optical, electrooptical, decorative, security, cosmetic, diagnostic, electric, electronic, charge transport, semiconductor, optical recording, electroluminescent, photoconductor or electrophotographic applications, and to liquid crystal, light-emitting and semiconducting materials, polymers and devices comprising them.

BACKGROUND AND PRIOR ART

In the search for novel materials for organic light-emitting diode (OLED), organic field emission transistor (OFET) and emissive liquid crystal display (eLCD) applications, a number of basic structure considerations are necessary:
  Materials should possess a highly conjugated structure, with a long UV wavelength absorbing chromophore. This facilitates efficient excitation of the molecule, either by photons or electrons, giving rise to photo- or electroluminescence.
  In order to be compatible with calamitic liquid crystalline media, and in order to be efficient emitters of polarised light, either by photo or electroluminescence, materials should ideally be rod-shaped molecules.
  The rod-like molecules should comprise lateral substituents in order to modify the melting point, the nature of mesophases and the solubility in common solvents or liquid crystal hosts.

It is generally known in LC structure property relationships that lateral substituents, such as halo, alkyl, alkoxy groups, in calamitic LC's reduce the melting point, modify the mesophase and improve the solubility. See for example Gray, G. W., Hird, M. & Toyne, K. J., 1991, Mol. Cryst. Liq. Cryst., 204, 43. Additionally it is known that for OLED polymers the lateral chains improve solubility as well as acting as a modifier to the electroluminescence properties. See for example Kraft, A., Grimsdale, A. C. & Holmes, A. B., 1998 Angewandte Chemie Intl. Edn. Engl., 37, 402-428.

There are many examples of liquid crystals with extended conjugated structures in prior art. Many of these find use as additives for high birefringence mixtures, useful especially in the infrared range of the electromagnetic spectrum, like for example the diphenyldiacetylene LC compounds disclosed in U.S. Pat. No. 6,312,618.

There are additionally prior art references to the use of fused ring structures as molecular components of liquid crystals, especially naphthalenes. In the emerging field of organic charge transport materials, the work of Hanna is especially relevant, as it details the advantage of smectic LC ordering on charge transport in phenyl naphthalene structures. See for example Y. Toko, M. Funahashi, J. Hanna, Japan. Proceedings of SPIE—The International Society for Optical Engineering (2003), 4800 (Organic Light-Emitting Materials and Devices VI), 229-237; N. Yoshimoto, J. Hanna, Adv. Mater. 2002, 14(13-14), 988-991; H. Maeda, M. Funahashi, J. Hanna, Materials Research Society Symposium Proceedings (2000), 598 (Electrical, Optical, and Magnetic Properties of Organic Solid-State Materials V), BB3.61/1-BB3.61/6.

Additionally US 2001-0048982 teaches emissive LCD devices that include phenyl naphthalene materials.

Time of flight measurements show improvements to charge carrier mobility as smectic order increases. The reason for improved charge mobility is thought to be that smectic ordering allows closer packing of the planar aromatic cores.

However, many prior art materials are unsuitable as components of OLED or other optoelectronic devices, because the extent of their conjugation is limited, resulting in poor excitation properties for efficient electroluminescence.

The use of polymerisable LCs, also known as reactive mesogens (RM), for OLED and OFET applications, in particular as a means of producing polarised emission, has also been reported in prior art. For example, US-A-2003/0018097 discloses the use of a direactive RM comprising a 9,9'-dialkylfluorene group that is substituted in 2- and 7-position with a 5-phenyl-thiophene-2-yl group. Bacher, Bradley et al., J. Mat. Chem. 1999, 9, p. 2985 disclose a distyrylbenzene RM and its use for a polarised electroluminescence (EL) device. O'Neill et al., J. Appl. Phys. 2003, 93(3), p. 1465 disclose the use of and references contained within, disclose the use of some reactive mesogen species for polarised light emission.

However, the RMs cited in these references comprise an acrylate or 1-vinyl-allyloxycarbonyl group as polymerisable group, which can be disadvantageous for efficient OLED emission, as the carbonyl group is known to quench electroluminescence (see List et al., Adv. Mater. 2002, 14(5), p. 374). Additionally, these references report that residues of the photoinitiator used for polymerisation of the RMs can have a detrimental effect on electroluminescence. Meerholz et al., Nature 2003, 421, p. 829, however, report that it is possible to use a cationic photoinitiator process to produce a cross linked polymer OLED based on oxetane photopolymerisable groups without detriment to the OLED electroluminescent properties.

One aim of the present invention is to provide novel mesogenic or liquid crystalline compounds with a rod-shaped molecular structure which are optionally polymerisable, which do not have the drawbacks of prior art or do exhibit them to a lesser extent, have improved properties, and are especially suitable for liquid crystal, semiconducting and light-emitting applications, like LCD, eLCD, OLED and OFET devices.

The novel compounds should fulfill the above-mentioned basic structure requirements for OLED, OFET and eLCD use. Preferably they should exhibit a liquid crystal phase over a broad temperature range, allow close packing in a highly ordered mesophase, and show good charge transport and light emission properties.

Another aim of the invention is to extend the pool of materials suitable for LCD, OLED and OFET uses that are available to the expert.

Another aim of the invention is to provide advantageous uses for the novel compounds, such as liquid crystal, light emitting and semiconducting materials and devices, in particular LCDs, eLCDs, OLEDs and OFETs, anisotropic polymers, optical, electrooptical, decorative, security, cosmetic, diagnostic, electric, electronic, charge transport, semiconductor, optical recording, electroluminescent, photoconductor and electrophotographic applications.

Another aim of the invention is to provide improved LC, OLED and OFET materials, polymers and devices with that do not have the drawbacks of LC media known from prior art.

Another aim of the invention is to provide new oligo- and polymers for use as semiconductors or charge transport materials, which are easy to synthesize, have high charge mobility, good processibility and improved oxidative stability.

Other aims of the present invention are immediately evident to the person skilled in the art from the following detailed description.

The inventors of the present invention have found that the above mentioned drawbacks can be overcome by providing novel mesogenic anthracene derivatives as claimed in claim 1. These compounds have advantageous properties and are especially suitable for use in LCD, eLCD, OLED and OFET devices.

The compounds according to the present invention, which include anthracene as a major component of the aromatic core, pack in a very efficient manner and produce very efficient charge transport, thus making them good candidate materials for OFET use. Additionally, the anthracene moiety is highly fluorescent on irradiation with UV light, both as a solution and as a thin solid film.

Furthermore, the inventors have found that monomers, oligomers and polymers based on anthracene modified with photostabilising substituents in 9- and 10-position are suitable as semiconductors or charge transport materials. The presence of an alkoxy group R in the 9- and 10-positions of the anthracene ring system increase the solubility and thus the processability of the polyanthracenes.

EP 1 090 911 A2 discloses a bis(aminostyryl) anthracene compound emitting yellow or red light. U.S. Pat. No. 6,495,274 discloses an OLED device comprising a bis(aminostyryl) anthracene compound. However, these materials are not likely to be mesogenic as they do not have terminal chains, additionally they cannot be cross linked, as they have no reactive component. This would lead to serious deficiencies in device processing.

SUMMARY OF THE INVENTION

The invention relates to compounds, including reactive and non-reactive monomers, oligomers and polymers, comprising one or more identical or different groups of formula I $$-(G)_g-$$ I wherein
G is, in case of multiple occurrence independently of one another,

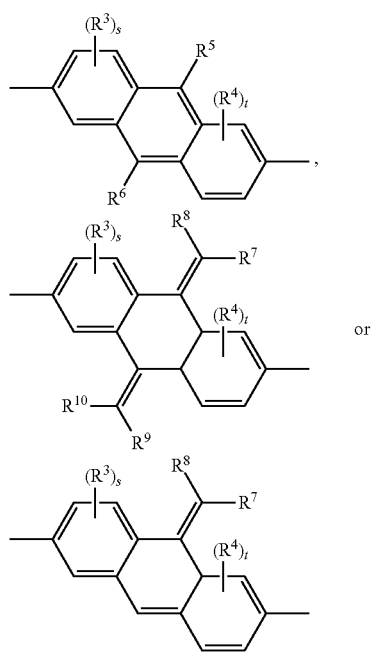

$R^3$ to $R^{10}$ are independently of each other F, Cl, Br, I, CN, $NO_2$, NCS, $SF_5$ or straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —NR$^0$—, —SiR$^0$R$^{00}$—, —CO—, —COO—, —COO—, —COO—O—, —S—CO—, —CO—S—, —CY$^1$=CY$^2$— or —C≡C— in such a manner that O and/or S atoms are not linked directly to one another, or P-Sp-, $R^0$ and $R^{00}$ are independently of each other H or alkyl with 1 to 12 C-atoms, P is a polymerisable or reactive group, Sp is a spacer group or a single bond, s and t are independently of each other 0, 1, 2 or 3, g is, in case of multiple occurrence independently of one another, 1, 2 or 3.

The invention further relates to an LC medium comprising at least one compound according to the present invention.

The invention further relates to a polymerisable LC material comprising at least one compound according to the present invention.

The invention further relates to a polymerisable LC material comprising at least one compound according to the present invention and optionally at least one further compound, wherein at least one of said compounds is polymerisable.

The invention further relates to a polymer obtained by polymerising a compound or a polymerisable LC material as described above and below.

The invention further relates to an anisotropic polymer obtained by polymerising a compound or a polymerisable LC material as described above and below in its oriented state, preferably in form of a film.

The invention further relates to a semiconductor or charge transport material comprising at least one compound or a polymerisable LC material or polymer as described above and below.

The invention further relates to a light-emissive material comprising at least one compound or a polymerisable LC material or polymer as described above and below.

The invention further relates to the use of compounds; mono-, oligo- and polymers, LC materials, semiconductor or light-emitting materials, polymerisable materials, polymers or polymer films as described above and below in electrooptical displays, LCDs, eLCDs, optical films, polarisers, compensators, beam splitters, reflective films, alignment layers, colour filters, holographic elements, hot stamping foils, coloured images, decorative or security markings e.g. for consumer objects or documents of value, LC pigments, adhesives, synthetic resins with anisotropic mechanical properties, cosmetics, pharmaceutics, diagnostics, nonlinear optics, optical information storage, as chiral dopants, in electronic devices like for example OFETs as components of integrated circuits (IC), as thin film transistors (TFT) in flat panel display applications or for Radio Frequency Identification (RFID) tags, in semiconducting or light-emitting components of organic light emitting diode (OLED) applications, electroluminescent displays or backlights of LCDs, for photovoltaic or sensor devices, as electrode materials in batteries, as photoconductors, or for electrophotographic applications or electrophotographic recording or as alignment layer in LCD or OLED devices.

The invention further relates to a semiconducting component, for example in OLED applications like electroluminescent displays or backlights of, e.g., liquid crystal displays, in photovoltaic or sensor devices, as electrode materials in batteries, as photoconductors and for electrophotographic applications, comprising one or more compounds, mono-, oligo- or polymers according to the invention.

The invention further relates to an optical, electrooptical or electronic device, in particular an LCD, eLCD, OLED, OFET, IC, TFT or alignment layer that comprises a compound, mono-, oligo- or polymer, an LC material, semiconductor or light-emitting material, a polymerisable material, polymer or polymer film as described above and below.

The invention further relates to a TFT or TFT array for flat panel displays, RFID tag, electroluminescent display or backlight comprising a compound, material, polymer or device, in particular comprising an LCD, eLCD, OFET, OLED, IC or TFT as described above and below.

The invention further relates to a security marking or device comprising a compound, material, polymer or device, in particular an LCD, OLED, OFET or RFID tag as described above and below.

Definition of Terms

The terms 'liquid crystalline or mesogenic material' or 'liquid crystalline or mesogenic compound' means materials or compounds comprising one or more rod-shaped, lath-shaped or disk-shaped mesogenic groups, i.e., groups with the ability to induce LC phase behaviour. The compounds or materials comprising mesogenic groups do not necessarily have to exhibit an LC phase themselves. It is also possible that they show LC phase behaviour only in mixtures with other compounds, or when the mesogenic compounds or materials, or the mixtures thereof, are polymerised.

The terms 'polymerisable' and 'reactive' refer to compounds or groups that are capable of participating in a polymerisation reaction, like radicalic or ionic chain polymerisation, polyaddition or polycondensation, and reactive compounds or reactive groups that are capable of being grafted for example by condensation or addition to a polymer backbone in a polymeranaloguous reaction. The terms 'non-polymerisable' and 'non-reactive' refer to compounds that do not have 'polymerisable' or 'reactive' groups.

The term 'film' includes self-supporting, i.e., free-standing, films that show more or less pronounced mechanical stability and flexibility, as well as coatings or layers on a supporting substrate or between two substrates.

DETAILED DESCRIPTION OF THE INVENTION

Especially preferred are compounds, mono-, oligo- and polymers of formula I1

$$-[(G)_g\text{-}(A)_a]_z-\qquad\qquad\text{I1}$$

wherein G and g have the meanings of formula I,
A is, in case of multiple occurrence independently of one another, $-CX^1=CX^2-$, $-C\equiv C-$, an aromatic or alicyclic ring or a group comprising two or more fused aromatic or alicyclic rings, wherein these rings optionally contain one or more hetero atoms selected from N, O and S, and are optionally mono- or polysubstituted by $R^3$ as defined in formula I,
$X^1$ and $X^2$ are independently of each other H, F, Cl or CN,
a is, in case of multiple occurrence independently of one another, 0 or 1,
z is an integer $\geq 1$,
wherein in case of multiple occurrence the groups $[(G)_g\text{-}(A)_a]$ can be identical or different.

Very preferred are compounds, mono-, oligo- and polymers of formula I1A $$R^1\text{-}[(G)_g\text{-}(A)_a]_z\text{-}R^2\qquad\qquad\text{I1A}$$

wherein G, g, A, a and z have the meanings of formula I1,
$R^1$ and $R^2$ have independently of each other one of the meanings of $R^3$ in formula I, or denote B(OR')(OR''), $SnR^0R^{00}R^{000}$ or $SiR^0R^{00}R^{000}$,
$R^{0\text{-}000}$ are independently of each other H, aryl or alkyl with 1 to 12 C-atom,
R' and R'' are independently of each other H or alkyl with 1 to 12 C-atoms, or OR' and OR'' together with the boron atom may also form a cyclic group having 2 to 10 C atoms.

Further preferred are compounds or monomers of formula I2

$$R^{11}\text{-}(A^1\text{-}Z^1)_m\text{-}(G^1)_u\text{-}Z^3\text{-}(A^3\text{-}Z^4)_q\text{-}(G^2)_v\text{-}(Z^2\text{-}A^2)_n\text{-}R^{12}\qquad\text{I2}$$

wherein
$G^1$ and $G^2$ have independently of each other one of the meanings of G in formula I,
$R^{11}$ and $R^{12}$ have independently of each other one of the meanings of $R^3$ in formula I,
$A^1$ to $A^3$ have independently of each other one of the meanings of A in formula I1,
$Z^1$ to $Z^4$ are independently of each other $-O-$, $-S-$, $-CO-$, $-COO-$, $-OCO-$, $-S-CO-$, $-CO-S-$, $-O-COO-$, $-CO-NR^0-$, $-NR^0-CO-$, $-OCH_2-$, $-CH_2O-$, $-SCH_2-$, $-CH_2S-$, $-CF_2O-$, $-OCF_2-$, $-CF_2S-$, $-SCF_2-$, $-CH_2CH_2-$, $-CF_2CH_2-$, $-CH_2CF_2-$, $-CF_2CF_2-$, $-CH=N-$, $-N=CH-$, $-N=N-$, $-CH=CR^0-$, $-CY^1=CY^2-$, $-C\equiv C-$, $-CH=CH-COO-$, $-OCO-CH=CH-$ or a single bond,
$Y^1$ and $Y^2$ are independently of each other H, F, Cl or CN,
$R^0$ and $R^{00}$ have the meanings given in formula I,
m, n and q are independently of each other 0, 1, 2 or 3,
u and v are independently of each other 0, 1 or 2, with u+v>0.

The compounds, mono-, oligo- and polymers according to the present invention are especially useful as charge transport semiconductors in that they have high carrier mobilities. Particularly preferred are mono-, oligo- and polymers wherein the group G is substituted by one or more alkyl or fluoroalkyl groups. The introduction of alkyl and fluoroalkyl side chains to the group G improves the solubility and therefore the solution processibility of the inventive materials. Furthermore, the presence of fluoroalkyl side chains also renders the inventive materials effective as n-type semiconductors. The electron-withdrawing nature of the fluoroalkyl substituents will also lower the HOMO further and result in a more stable material, which is less susceptible to oxidation Particularly preferred are compounds, mono-, oligo- and polymers comprising at least one group G and at least one reactive group that is capable of a polymerisation or crosslinking reaction.

Further preferred are compounds, mono-, oligo- and polymers comprising at least one group G that are mesogenic or liquid crystalline, in particular polymers of formula I1A forming calamitic phases, and compounds or reactive mesogens of formula I2 forming calamitic phases.

In the oligo- and polymers of the present invention the recurring units $[(G)_g\text{-}(A)_a]$ in case of multiple occurrence can be selected of formula I1 independently of each other, so that an oligo- or polymer may comprise identical or different recurring units $[(G)_g\text{-}(A)_a]$. The oligo- and polymers thus include homopolymers and copolymers like for example statistically random copolymers, for example with a monomer sequence such as -G-A-G-G-A-G-A-A-A-, alternating copolymers, for example with a monomer sequence such as -G-A-G-A-G-A-, block copolymers, for example with a monomer sequence such as -A-A-G-G-G-G-A-A-A-G-G-G-, and homopolymers -G-G-G-G-, wherein the groups G and A preferably together form a conjugated system.

Further preferred are mono-, oligo- and polymers comprising one or more recurring units $[(G)_g\text{-}(A)_a]$, wherein g=1 and a=0, very preferably consisting exclusively of such recurring units.

Further preferred are mono-, oligo- and polymers comprising one or more recurring units $[(G)_g\text{-}(A)_a]$, wherein g=a=1, very preferably consisting exclusively of such recurring units.

The novel compounds have the following advantages they are easy to prepare in excellent yield from cheap, commercially available starting materials, they are rod-shaped and suitable as components of LC mixtures in LCDs. They do not necessarily have to exhibit an LC phase themselves, but by being rod-shaped they do not diminish the LC properties of an LC host in which they are dissolved, they can be polymerised if appropriately substituted, they pack in a very efficient manner and produce very efficient charge transport, thus making them good candidate materials for OFET use, the anthracene moiety is highly fluorescent on irradiation with UV light, both as a solution and as a thin solid film, and is in particularly suitable for materials emitting blue light, potential electroluminescent dopants for eLCD application can be synthesised to have nematic phases, moderate melting points and good solubility in nematic LC host mixtures.

Anthracene is particularly good as an emissive LC core, due to the extent of pi electron delocalisation across the rings.

In particular the lateral disubstitution of the anthracene core in the compounds of the present invention leads to a number of advantageous properties, like for example the following:

In prior art it has been reported that in 2,6-substituted anthracenyl LC materials the central positions of the anthracene ring are susceptible to photo dimerisation in a 2+2 cycloaddition reaction (Mery et. al. J. Mat. Chem., 2003, 13, 1622-1630). In contrast, in the compounds of the present invention a "capping" substituent is placed on each of the vulnerable 9- and 10-positions, which blocks any photodimerisation reaction and improves material stability.

In an extended polyaromatic core like that of the compounds of formula I2, comprising the anthracene group plus one or more ring groups $A^{1-3}$, the use of long chain substituents $R^5$ to $R^{10}$ on the anthracene core has a disrupting effect on the crystalline packing of cores. This reduces the melting point and promotes nematic phases. This is especially beneficial for electroluminescence, where close crystalline packing of aromatic cores can promote quenching and excimer emission at longer wavelengths. Additionally, if the lateral substituents are chosen correctly, tuning of the electroluminescence wavelength is possible.

The preferred field of use of materials according to the present invention is as semiconductor or charge transport or as light-emitting material, or as a component of such materials. These materials can be used in electronic devices like for example OFETs as components of ICs, as TFTs in flat panel display applications or for RFID tags, or in semiconducting or light-emitting components for OLED applications, electroluminescent displays or backlights of LCDs, for photovoltaic or sensor devices.

Another aspect of the invention relates to polymerisable compounds, in particular those of formula I2, also known as reactive mesogens (RM), and to LC polymers obtained from these compounds or mixtures comprising them.

Especially suitable polymerisable compounds, in particular for semiconductor and light-emitting applications, are those having polymerisable groups P selected from vinyl ether and propenyl ether, as these are linear photopolymerisable groups. These compounds have improved mesogenicity and reduced flow viscosity, both of which are desirable for processing of the materials for use in devices, specifically by reducing the time required for self alignment of the molecules in LC phases compared to other RM polymerisable groups, such as acrylates and to LC polymer materials.

Another aspect of the invention relates to highly ordered anisotropic LC polymer films that are obtained from polymerisable compounds or reactive mesogens of the present invention, in particular those of formula I2, or mixtures comprising them, by aligning them in their LC phase into uniform orientation and polymerising them in situ, e.g. by thermal or photopolymerisation.

The compounds of the present invention can also be used in mixtures for LCD applications, in particular for applications using LC mixtures in the nematic or isotropic phase where high birefringence is required.

Furthermore, the compounds of the present invention can be used as reactive mesogens to make polymers or polymer films for use as optical films, in particular optical retardation or compensation films, alignment layers, colour filters or polarisers in an LCD.

It is also possible to co-polymerise compounds of the present invention via group P with other polymerisable mesogenic or LC monomers, and/or with other compounds of the present invention, in order to induce or enhance LC phase behaviour.

The LCDs according to the present invention are for example conventional LCDs, in particular those of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multi-domain vertically aligned) or PVA (patterned vertically aligned) displays, in displays of the bend mode or hybrid type displays, like e.g. OCB (optically compensated bend cell or optically compensated birefringence), R—OCB (reflective OCB), HAN (hybrid aligned nematic) or pi-cell (π-cell) displays, furthermore in displays of the TN (twisted nematic), HTN (highly twisted nematic) or STN (super twisted nematic), in AMD-TN (active matrix driven TN) displays, in displays of the IPS (in plane switching) mode which are also known as 'super TFT' displays, in displays using liquid crystals in the isotropic state, hereinafter shortly referred to as "isotropic mode display", as described for example in DE 102 172 73 and WO 02/93244 A1, or in bistable nematic displays.

Particularly preferred compounds, mono-, oligo- and polymers of formula I, I1, I1A and I2 are those wherein
G is of a group of the formula

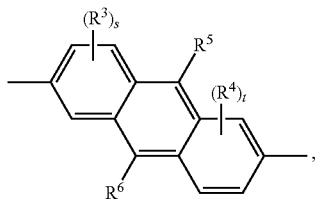

z is an integer from 1 to 5000,
z is an integer from 2 to 5000, in particular from 20 to 1000,
z is an integer from 2 to 5,
z is 2 and one or both of $R^1$ and $R^2$ denote P-Sp-,
z is an integer from 1 to 15 and one or both of $R^1$ and $R^2$ denote P-Sp-,
z is an integer from 2 to 5000 and $R^1$ and $R^2$ are not P-Sp-,
the molecular weight is from 5000 to 100,000,
A or A'' denote optionally substituted arylene or heteroarylene,
A or $A^{1-3}$ denote —$CX^1$=$CX^2$— or —C≡C—,
in at least one recurring unit $[(G)_g$-$(A)_a]$ g=a=1,
$Z^{1-4}$ are selected from —O—, —CH=$CR^0$—, —$CY^1$=$CY^2$—, —C≡C—, or a single bond, most preferably —CH=CH—, —C≡C— or a single bond
at least one of $Z^{1-4}$, preferably $Z^1$ and $Z^2$, especially all of $Z^{1-4}$ denote a single bond,
A or $A^{1-3}$ denote 1,4-phenylene that is optionally substituted by one or more groups $R^3$, in particular 1,4-phenylene substituted by one or two fluorine atoms.
one or both of $R^1$ and $R^2$ denote P-Sp-,
$R^3$ and $R^4$ are selected from F, Cl, CN, alkyl, oxaalkyl, alkoxy, alkylcarbonyl or alkoxycarbonyl with 1 to 15 C-atoms or alkenyl, alkenyloxy or alkynyl with 2 to 15 C-atoms,
Sp is alkylene with 2 to 12 C atoms which is optionally mono- or polysubstituted by F and wherein one or more non-adjacent $CH_2$ may be replaced, in each case independently from one another, by —O—, —CH=CH— or —C≡C—, preferably —$(CH_2)_u$— wherein u is an integer from 1 to 6,
Sp is linked to $A^{1-3}$ via a group selected from —O—, —COO—, —OCO—, —OCOO— and a single bond.
Sp is single bond,
m and n are 1,
m is 1 and n is 0 or 1,
m and n are 2,
s and/or t are 0,
s and/or t is 1 or 2,
u is 1 and v is 1,
v is 0 and q is 0,
u=v=q=1,
$R^{5-10}$ are selected from F, Cl, CN, $C_1$-$C_{20}$-alkyl that is optionally substituted with one or more fluorine atoms, $C_1$-$C_{20}$-alkenyl, $C_1$-$C_{20}$-alkynyl, $C_1$-$C_{20}$-alkoxy, $C_1$-$C_{20}$-thioalkyl, $C_1$-$C_{20}$-silyl, $C_1$-$C_{20}$-ester, $C_1$-$C_{20}$-amino, $C_1$-$C_{20}$-fluoroalkyl, $(CH_2CH_2O)_m$ with m being an integer from 1 to 6, very preferably $C_1$-$C_{20}$-alkyl $C_1$-$C_{20}$-alkoxy, $C_1$-$C_{20}$-thioalkyl or $C_1$-$C_{20}$-fluoroalkyl,
A and A'' are independently of each other an aromatic or alicyclic ring, preferably a 5-, 6- or 7-membered ring, or a group comprising two or more, preferably two or three, fused aromatic or alicyclic rings, wherein these rings optionally contain one or more hetero atoms selected from N, O and S, and are optionally mono- or polysubstituted with $R^3$ as defined above.
$R^3$ and $R^4$ are preferably F, Cl, CN, OH, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$ or $OC_2F_5$, in particular F, Cl, CN, $CH_3$, $C_2H_5$, $OCH_3$, $COCH_3$ or $OCF_3$, most preferably F, Cl, $CH_3$, $OCH_3$ or $COCH_3$.
Preferred groups A and $A^{1-3}$ are for example furan, pyrrol, thiophene, oxazole, thiazole, thiadiazole, imidazole, phenylene, cyclohexylene, cyclohexenylene, pyridine, pyrimidine, pyrazine, azulene, indane, naphthalene, tetrahydronaphthalene, anthracene and phenanthrene.
Particularly preferably A and $A^{1-3}$ are selected from furane-2,5-diyl, thiophene-2,5-diyl, thienothiophene-2,5-diyl, dithienothiophene-2,6-diyl, pyrrol-2,5-diyl, 1,4-phenylene, azulene-2,6-diyl, pyridine-2,5-diyl, pyrimidine-2,5-diyl, naphthalene-2,6-diyl, 1,2,3,4-tetrahydro-naphthalene-2,6-diyl, indane-2,5-diyl, or 1,4-cyclohexylene wherein one or two non-adjacent $CH_2$ groups are optionally replaced by O and/or S, wherein these groups are unsubstituted, mono- or polysubstituted by $R^3$ as defined above.
Preferably the groups $(A^1$-$Z^1)_m$ and $(Z^2$-$A^2)_n$ and $(A^3$-$Z^4)_q$ contain only monocyclic groups $A^{1-3}$. Very preferably the groups $(A^1$-$Z^1)_m$ and $(Z^2$-$A^2)_n$ and $(A^3$-$Z^4)_c$, comprise one or two 5- or 6-membered rings.
The groups $(A^1$-$Z^1)_m$ and $(Z^2$-$A^2)_n$ and $(A^3$-$Z^4)_q$ can be identical or different. In a preferred embodiment of the present invention the groups $(A^1$-$Z^1)_m$ and $(Z^2$-$A^2)_n$ are mirror images of each other, and very preferably the group $(A^1$-$Z^1)_m$-$(G^1)_u$-$Z^3$-$(A^3$-$Z^4)_q$-$(G^2)_v$-$(Z^2$-$A^2)_n$ is a symmetric group. In another preferred embodiment of the present invention the groups $(A^1$-$Z^1)_n$, and $(Z^2$-$A^2)_n$ and $(A^3$-$Z^4)_q$ are different.
Preferred subformulae for the groups $(A^1$-$Z^1)_m$ and $(Z^2$-$A^2)_n$ and $(A^3$-$Z^4)_q$ are listed below. For reasons of simplicity, Phe in these groups is 1,4-phenylene, PheL is a 1,4-phenylene group which is substituted by 1 to 4 groups L, wherein L has one of the meanings of $R^3$ as defined above, Pyd is pyridine-2,5-diyl and Pyr is pyrimidine-2,5-diyl. The following list of preferred groups does also comprise the mirror images of the subformulae shown

| | |
|---|---|
| -Phe-Z- | II-1 |
| -Pyd-Z- | II-2 |
| -Pyr-Z- | II-3 |
| -PheL-Z- | II-4 |
| -Cyc-Z- | II-5 |
| -Phe-Z-Cyc-Z- | II-6 |
| -Cyc-Z-Cyc-Z- | II-7 |
| -PheL-Cyc-Z- | II-8 |
| -Phe-Z-Phe-Z- | II-9 |
| -Phe-Z-Pyd-Z- | II-10 |
| -Pyd-Z-Phe-Z- | II-11 |
| -Phe-Z-Pyr-Z- | II-12 |
| -Pyr-Z-Phe-Z- | II-13 |
| -PheL-Z-Phe-Z- | II-14 |

-PheL-Z-Pyd-Z- II-15

-PheL-Z-Pyr-Z- II-16

-Pyr-Z-Pyd-Z- II-17

-Pyd-Z-Pyd-Z- II-18

-Pyr-Z-Pyr-Z- II-19

-PheL-Z-PheL-Z- II-20

In these preferred groups Z has the meaning of $Z^1$ as given in formula I. Preferably Z is —$CH_2CH_2$—, —$CY^1$=$CY^2$—, —C≡C— or a single bond.

Very preferably $(A^1\text{-}Z^1)$, and $(A^3\text{-}Z^4)_n$ and $(Z^2\text{-}A^2)_n$ are selected from the following formulae and their mirror images

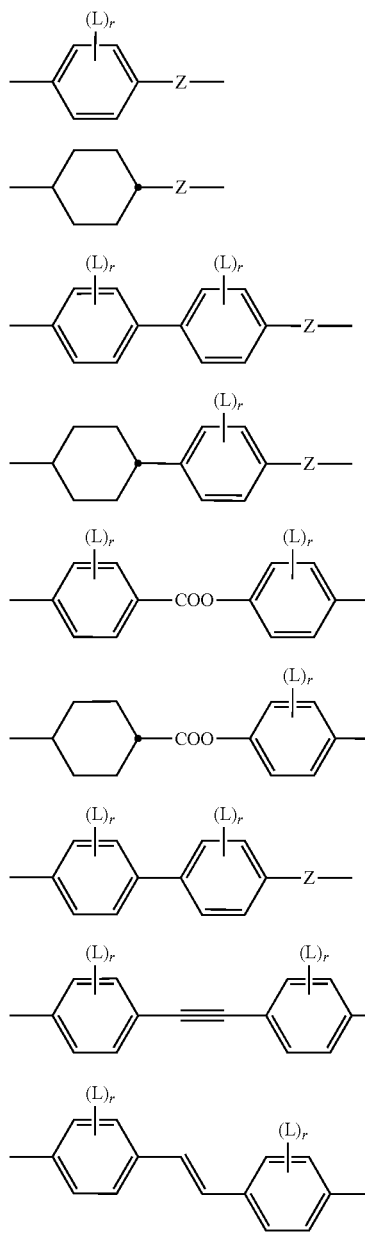

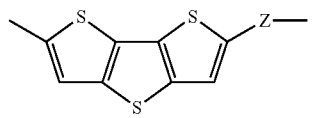  IIk

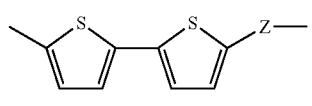  IIm

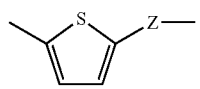  IIn

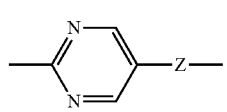  IIo

IIp

IIq

IIr

IIs wherein L has one of the meanings of $R^3$ given above and r is 0, 1, 2, 3 or 4, preferably 0, 1 or 2.

The group

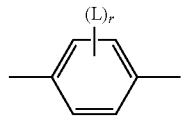

in these preferred formulae is very preferably denoting

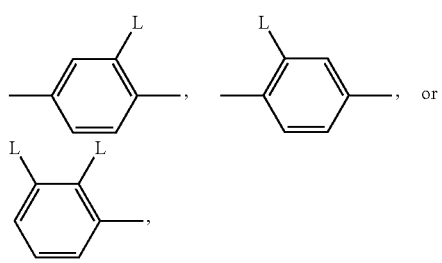

furthermore

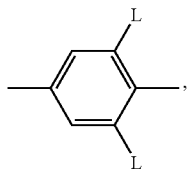

with L having each independently one of the meanings given above.

Especially preferred compounds comprise at least one group

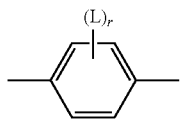

wherein r is 1.

Further preferred compounds comprise at least two groups

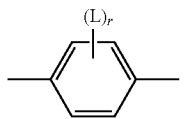

wherein r is 1 and/or at least one group

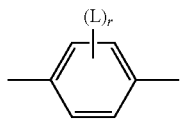

wherein r is 2.

Aryl and heteroaryl preferably denote a mono-, bi- or tricyclic aromatic or heteroaromatic with up to 25 C atoms, wherein the rings can be fused, and in which the heteroaromatic groups contain at least one hetero ring atom, preferably selected from N, O and S. The aryl and heteroaryl groups are optionally substituted with one or more of F, Cl, Br, I, CN, and straight chain, branched or cyclic alkyl having 1 to 20 C atoms, which is unsubstituted, mono- or poly-substituted by F, Cl, Br, I, —CN or —OH, and in which one or more non-adjacent $CH_2$ groups are optionally replaced, in each case independently from one another, by —O—, —S—, —NH—, —NR$^0$—, —SiR$^0$R$^{00}$—, —CO—, —COO—, OCO—, —COO—O, —S—CO—, —CO—S—, —CH=CH— or —C≡C— in such a manner that O and/or S atoms are not linked directly to one another.

Especially preferred aryl and heteroaryl groups are phenyl in which, in addition, one or more CH groups may be replaced by N, naphthalene, thiophene, thienothiophene, dithienothiophene, alkyl fluorene and oxazole, all of which are unsubstituted, mono- or polysubstituted with L, wherein L is halogen or an alkyl, alkoxy, alkylcarbonyl or alkoxycarbonyl group with 1 to 12 C atoms, wherein one or more H atoms are optionally replaced by F or Cl.

Arylene and heteroarylene preferably denote a mono-, bi- or tricyclic divalent aromatic or heteroaromatic radicals with up to 25 C atoms, wherein the rings can be fused, and in which the heteroaromatic groups contain at least one hetero ring atom, preferably selected from N, O and S. The arylene and heteroarylene groups are optionally substituted with one or more of F, Cl, Br, I, CN, and straight chain, branched or cyclic alkyl having 1 to 20 C atoms, which is unsubstituted, mono- or poly-substituted by F, Cl, Br, I, —CN or —OH, and in which one or more non-adjacent $CH_2$ groups are optionally replaced, in each case independently from one another, by —O—, —S—, —NH—, —NR$^0$—, —SiR$^0$R$^{00}$—, —CO—, —COO—, OCO—, —COO—O, —S—CO—, —CO—S—, —CH=CH— or —C≡C— in such a manner that O and/or S atoms are not linked directly to one another.

Especially preferred arylene and heteroarylene groups are 1,4-phenylene in which, in addition, one or more CH groups are optionally replaced by N, naphthalene-2,6-diyl, thiophene-2,5-diyl, thienothiophene-2,5-diyl, dithienothiophene-2,6-diyl, alkyl fluorene and oxazole, all of which are unsubstituted, mono- or polysubstituted with L as defined above.

$CX^1=CX^2$ is preferably —CH=CH—, —CH=CF—, —CF=CH—, —CF=CF—, —CH=C(CN)— or —C(CN)=CH—.

If one of $R^{1-10}$ is an alkyl or alkoxy radical, i.e. where the terminal $CH_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

If one of $R^{1-10}$ is an alkyl group wherein one or more $CH_2$ groups are replaced by —CH=CH—, this may be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_{7-6}$-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

If one of $R^{1-10}$ is an alkyl or alkenyl group that is monosubstituted by CN or $CF_3$, it is preferably straight-chain. The substitution by CN or $CF_3$ can be in any desired position.

If one of $R^{1-10}$ is an alkyl or alkenyl group that is at least monosubstituted by halogen, it is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluormethyl, 2-fluorethyl, 3-fluorpropyl, 4-fluorbutyl, 5-fluorpentyl, 6-fluorhexyl and 7-fluorheptyl. Other positions of F are, however, not excluded.

Halogen is preferably F or Cl.

$R^{1-10}$ can be a polar or a non-polar group. In case of a polar group, it is selected from CN, $SF_5$, halogen, $OCH_3$, SCN, $COR^{11}$, $COOR^{11}$ or a mono- oligo- or polyfluorinated alkyl or alkoxy group with 1 to 4 C atoms. $R^{11}$ is optionally fluorinated alkyl with 1 to 4, preferably 1 to 3 C atoms. Especially preferred polar groups are selected of F, Cl, CN, $OCH_3$, $COCH_3$, $COC_2H_5$, $COOCH_3$, $COOC_2H_5$, $CF_3$, $CHF_2$, $CH_2F$, $OCF_3$, $OCHF_2$, $OCH_2F$, $C_2F_5$ and $OC_2F_5$, in particular F, Cl, CN, $CF_3$, $OCHF_2$ and $OCF_3$. In case of a non-polar group, it is preferably alkyl with up to 15 C atoms or alkoxy with 2 to 15 C atoms.

$R^{1-10}$ can be an achiral or a chiral group. In case of a chiral group it is preferably selected of formula III:

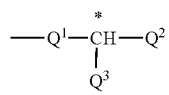
(III)

wherein
$Q^1$ is alkylene or alkylene-oxy with 1 to 9 C atoms, arylene or heteroarylene as defined above, or a single bond,
$Q^2$ is alkyl or alkoxy with 1 to 10 C atoms which may be unsubstituted, mono- or polysubstituted by F, Cl, Br or CN, it being also possible for one or more non-adjacent $CH_2$ groups to be replaced, in each case independently from one another, by —C≡C—, —O—, —S—, —NH—, —N($CH_3$)—, —CO—, —COO—, —COO—, —COO—O—, —S—CO— or —CO—S— in such a manner that oxygen atoms are not linked directly to one another, or aryl or heteroaryl as defined above, being different from $Q^1$ or $Q^3$,
$Q^3$ is F, Cl, Br, CN or alkyl, alkoxy, aryl or heteroaryl as defined for $Q^2$ but being different from $Q^2$ or $Q^1$, In case $Q^1$ in formula III is an alkylene-oxy group, the O atom is preferably adjacent to the chiral C atom.

Preferred chiral groups of formula III are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)-alkoxy, 1,1,1-trifluoro-2-alkyl and 1,1,1-trifluoro-2-alkoxy.

Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

In addition, compounds containing an achiral branched group $R^{1-10}$ may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

The polymerisable or reactive group P is preferably selected from
$CH_2$=$CW^1$—COO—,

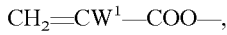

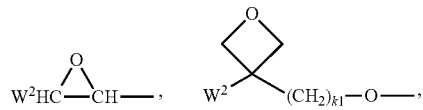

$CH_2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, HO—$CW^2W^3$—, HS—$CW^2W^3$—, H$W^2$N—, HO—$CW^2W^3$—NH—, $CH_2$=$CW^1$—CO—NH—, $CH_2$=CH—(COO)$_{k1}$-Phe-(O)$_{k2}$—, Phe-CH=CH—, HOOC—, OCN—, and $W^4W^5W^6$Si—, with $W^1$ being H, Cl, CN, phenyl or alkyl with 1 to 5 C-atoms, in particular H, $C_1$ or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1. P can also denote a protected derivative of the reactive or polymerisable groups as described above and below. Compounds with protected polymerisable groups can be desired for example in cases where spontaneous polymerisation should be prevented, e.g. during storage of the compounds. Suitable protective groups are known to the expert and described in the literature, for example in Greene and Greene, "Protective Groups in Organic Synthesis", John Wiley and Sons, New York (1981), like for example acetals or ketals or the protected versions thereof.

Especially preferably P is a group without a carbonyl moiety, preferably selected from

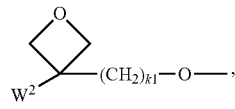

$CH_2$=$CW^2$—(O)$_{k1}$— and $CH_3$—CH=CH—O— as defined above, very preferably a vinyl group $CH_2$=CH—, a vinyl ether group $CH_2$=CH—O—, a propenyl ether group $CH_3$—CH=CH—O— or an oxetane group of formula

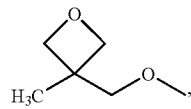

most preferably a vinyl ether group.

As for the spacer group Sp all groups can be used that are known for this purpose to the skilled in the art. The spacer group Sp is preferably of formula Sp'-X, such that P-Sp- is P-Sp'-X—, wherein
Sp' is alkylene with up to 30 C atoms which is unsubstituted or mono- or polysubstituted by F, Cl, Br, I or CN, it being also possible for one or more non-adjacent $CH_2$ groups to be replaced, in each case independently from one another, by —O—, —S—, —NH—, —NR⁰—, —SiR⁰R⁰⁰—, —CO—, —COO—, —COO—, —COO—O—, —S—CO—, —CO—S—, —CH═CH— or —C≡C— in such a manner that O and/or S atoms are not linked directly to one another, X is —O—, —S—, —CO—, —COO—, —COO—, —O—COO—, —CO—NR⁰—, —NR⁰—CO—, —OCH₂—, —CH₂O—, —SCH₂—, —CH₂S—, —CF₂O—, —OCF₂—, —CF₂S—, —SCF₂—, —CF₂CH₂—, —CH₂CF₂—, —CF₂CF₂—, —CH═N—, —N═CH—, —N═N—, —CH═CR⁰—, —CY¹═CY²—, —CH═CH—COO—, —OCO—CH═CH— or a single bond, and R⁰, R⁰⁰, Y¹ and Y² have one of the meanings given above.

X is preferably —O—, —S—, —OCH₂—, —CH₂O—, —SCH₂—, —CH₂S—, —CF₂O—, —OCF₂—, —CF₂S—, —SCF₂—, —CH₂CH₂—, —CF₂CH₂—, —CH₂CF₂—, —CF₂CF₂—, —CH═N—, —N═CH—, —N═N—, —CH═CR⁰—, —CX¹═CX²—, —C≡C— or a single bond, in particular —O—, —S—, —C≡C—, —CX¹═CX²— or a single bond. In another preferred embodiment X is a group that is able to form a conjugated system, such as —C≡C— or —CX¹═CX²—, or a single bond.

Typical groups Sp' are, for example, —(CH₂)ₚ—, —(CH₂CH₂O)_q—CH₂CH₂—, —CH₂CH₂—S—CH₂CH₂— or —CH₂CH₂—NH—CH₂CH₂— or —(SiR⁰R⁰⁰—O)ₚ—, with p being an integer from 2 to 12, q being an integer from 1 to 3 and R⁰ and R⁰⁰ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene, 1-methylalkylene, ethenylene, propenylene and butenylene for example.

In another preferred embodiment Sp' is a chiral group of formula IV:

wherein
Q' and Q³ have the meanings given in formula III, and
Q⁴ is an alkylene or alkylene-oxy group with 1 to 10 C atoms or a single bond, being different from Q',
with Q¹ being linked to the polymerizable group P.

Further preferred are compounds with one or two groups P-Sp- wherein Sp is a single bond.

In case of compounds with two groups P-Sp, each of the two polymerisable groups P and the two spacer groups Sp can be identical or different.

Especially preferred are compounds comprising one or more repeating units of the following formulae

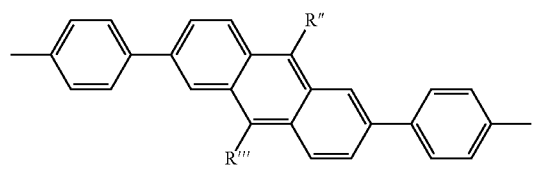

Ia

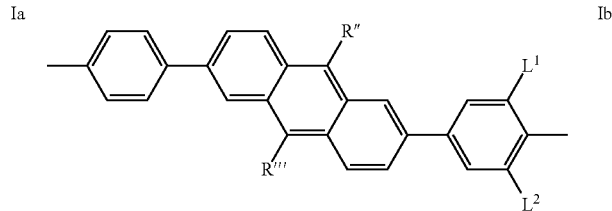

Ib

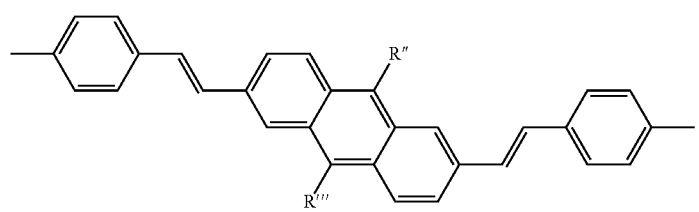

Ic

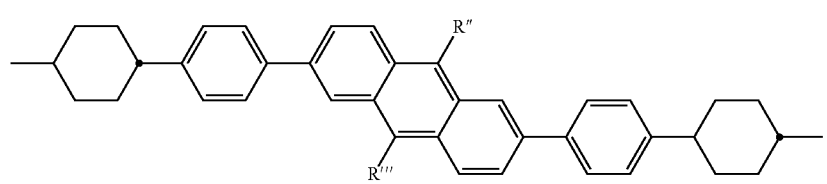

Id

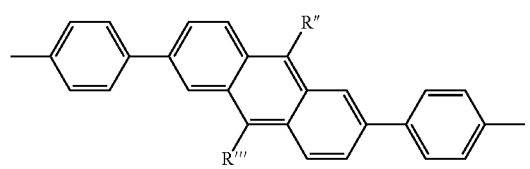

Ie

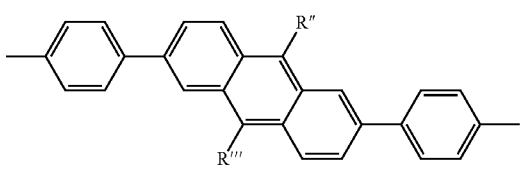

If

-continued

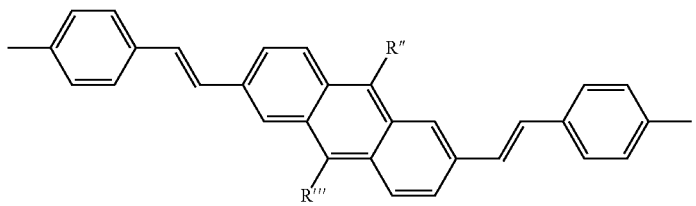

Ig

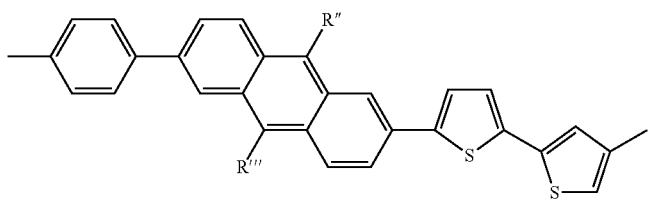

Ih

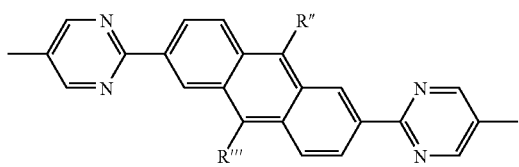

Ii

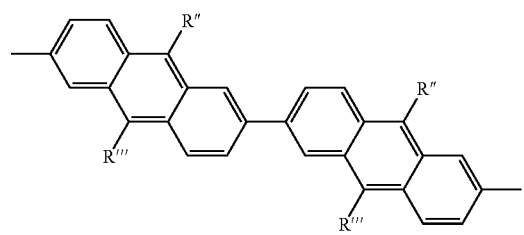

Ik

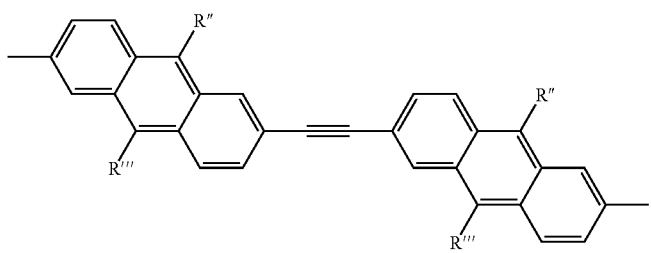

Im

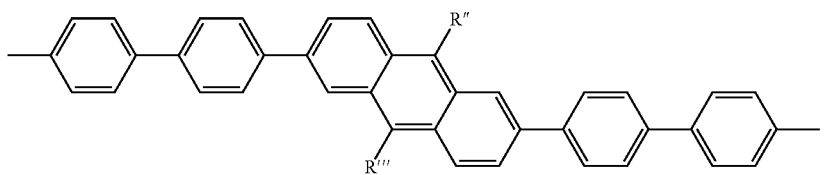

In

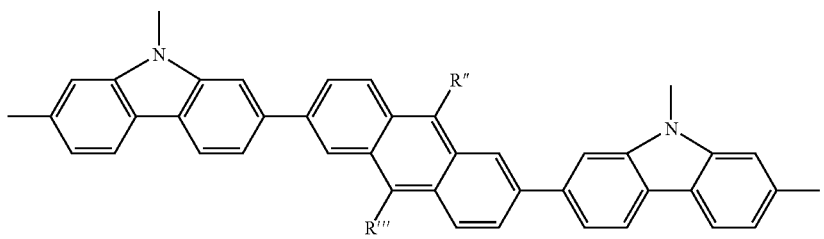

Io wherein
R and R' have independently of each other one of the meanings of $R^1$ in formula I and are preferably straight chain alkyl or alkoxy with 1 to 12 C-atoms or alkenyl, alkenyloxy or alkynyl with 2 to 12 C-atoms,
R" and R'" have independently of each other one of the meanings of $R^5$ in formula I and are preferably straight chain alkyl, alkoxy, thioalkyl or fluorinated alkyl with 1 to 20 C-atoms, very preferably with 5 to 15 C-atoms, and wherein the aromatic rings are optionally substituted with 1, 2 or 3 groups $R^3$ as defined above.

Particularly preferred compounds of formula I2 are those of the following formulae

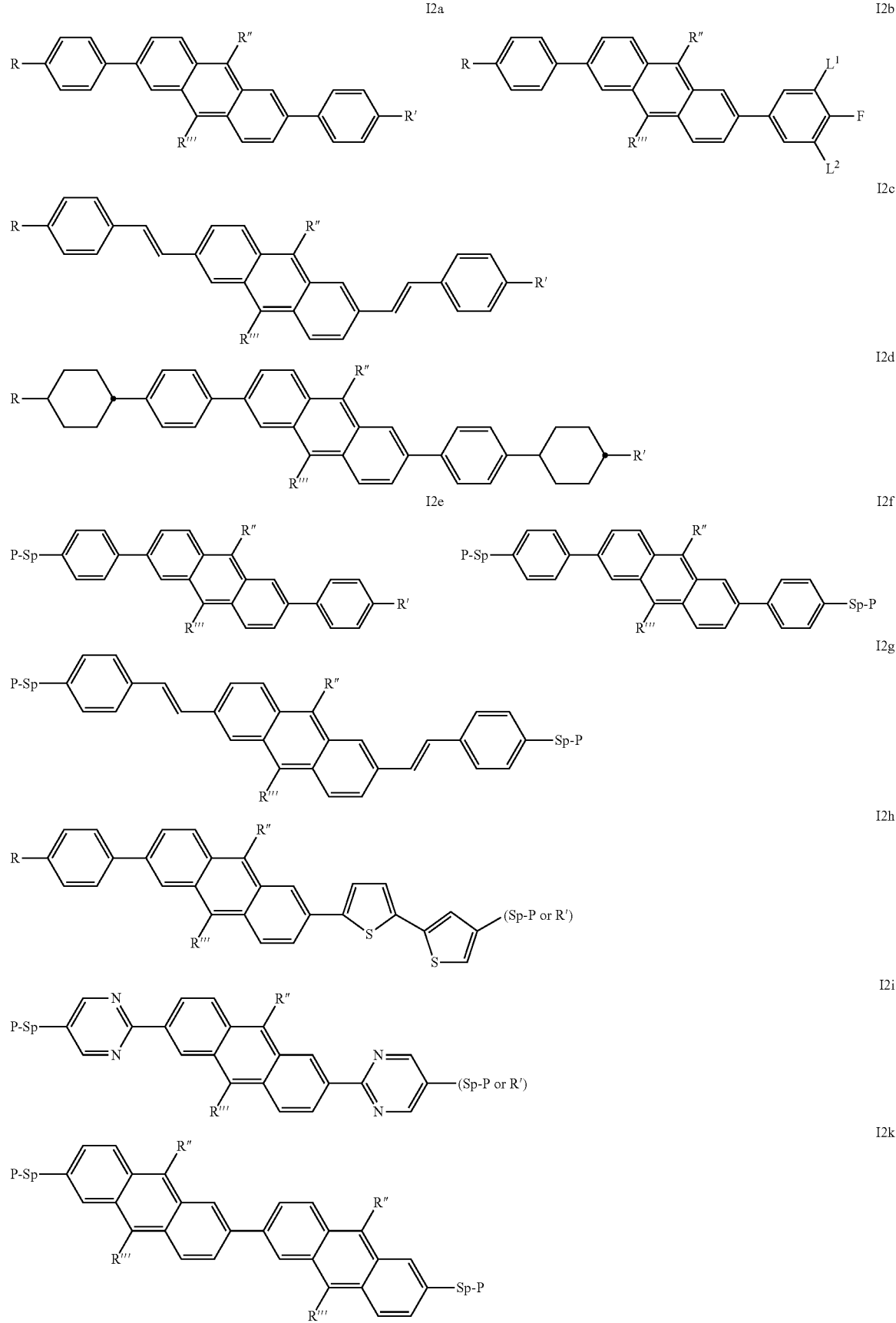

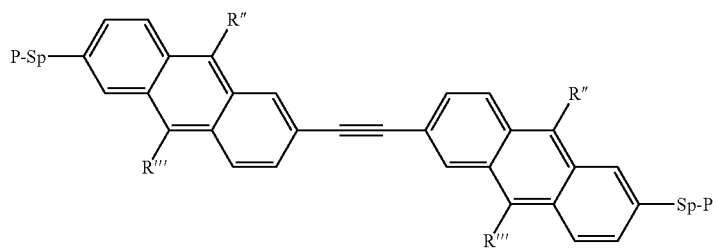

I2m

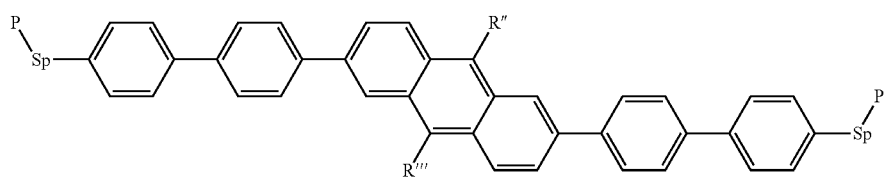

I2n

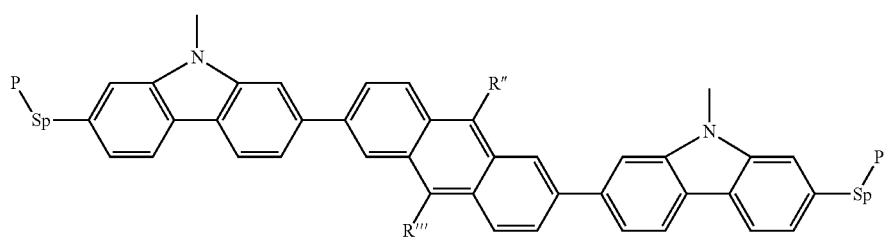

I2o wherein P, Sp, R, R', R" and R'" are as defined above and $L^1$ and $L^2$ are independently of each other H or F, and wherein the aromatic rings are optionally substituted with 1, 2 or 3 groups $R^3$ as defined above.

Particularly preferred oligo- and polymers of formula I1 or I1A are those comprising a recurring unit selected from the above preferred formulae Ia to Im (without the terminal groups R or P-Sp), wherein z is an integer from 2 to 5000, in particular from 20 to 1000, Ar is 1,4-phenylene, 2,6-naphthalene, alkoxyphenylene, alkylfluorene, thiophene-2,5-diyl, thienothiophene-2,5-diyl or dithienothiophene-2,6-diyl, $X^1$ and $X^2$ are H, CN or F, and wherein $R^4$ and $R^5$ are independently of each other H, halogen, alkyl with 1-16 C atoms that is optionally fluorinated, or P-Sp-.

SCLCPs obtained from the inventive compounds or mixtures by polymerisation or copolymerisation have a backbone that is formed by the polymerisable group P.

The compounds according to the present invention can be synthesized according to or in analogy to methods which are known per se and which are described in standard works of organic chemistry such as, for example, Houben-Weyl, Methoden der organischen Chemie, Thieme-Verlag, Stuttgart. Some specific and preferred methods are described in the reaction schemes below. Further methods can be taken from the examples.

The LC media according to the present invention preferably contain at least one compound of the present invention, very preferably of formula I2, and a nematic host mixture comprising one or more nematic or nematogenic compounds.

Preferably the LC media consist of 2 to 25, preferably 3 to 15 compounds, at least one of which is a compound of formula I. The other compounds forming the nematic host mixture are preferably low molecular weight liquid crystal compounds selected from nematic or nematogenic substances, for example from the known classes of the azoxybenzenes, benzylidene-anilines, biphenyls, terphenyls, phenyl or cyclohexyl benzoates, phenyl or cyclohexyl esters of cyclohehexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexyl-biphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclo-hexylpyrimidines, phenyl- or cyclohexylpyridines, phenyl- or cyclohexylpyridazines, phenyl- or cyclohexyldioxanes, phenyl- or cyclo-hexyl-1,3-dithianes, 1,2-diphenyl-ethanes, 1,2-dicyclohexylethanes, 1-phenyl-2-cyclohexylethanes, 1-cyclohexyl-2-(4-phenylcyclohexyl)-ethanes, 1-cyclohexyl-2-biphenyl-ethanes, 1-phenyl-2-cyclohexyl-phenylethanes, optionally halogenated stilbenes, benzyl phenyl ether, tolanes, substituted cinnamic acids and further classes of nematic or nematogenic substances. The 1,4-phenylene groups in these compounds may also be laterally mono- or difluorinated.

The most important compounds that are possible as components of these LC mixtures can be characterized by the following formula

R'-L'-G'-E-R"

wherein L' and E, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl abd B is 2-(trans-1,4-cyclohexyl)ethyl, pyrimidine-2,5-diyl, pyridine-2,5-diyl or 1,3-dioxane-2,5-diyl.

G' in these compounds is selected from the following bivalent groups —CH═CH—, —N(O)N—, —CH═CY—, —CH=N(O)—, —C≡C—, —CH$_2$—CH$_2$—, —CO—O—, —CH$_2$—O—, —CO—S—, —CH$_2$—S—, —CH=N—, —COO-Phe-COO— or a single bond, with Y being halogen, preferably chlorine, or —CN.

R' and R" are, in each case, independently of one another, alkyl, alkenyl, alkoxy, alkenyloxy, alkanoyloxy, alkoxycarbonyl or alkoxycarbonyloxy with 1 to 18, preferably 3 to 12 C atoms, or alternatively one of R' and R" is F, CF$_3$, OCF$_3$, Cl, NCS or CN.

In most of these compounds R' and R" are, in each case, independently of each another, alkyl, alkenyl or alkoxy with different chain length, wherein the sum of C atoms in nematic media generally is between 2 and 9, preferably between 2 and 7.

Many of these compounds or mixtures thereof are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

Another aspect of the present invention relates to compounds of the present invention that comprise one or more polymerisable groups. Very preferred materials of this type are monomers of formula I2 wherein R$^1$ and/or R$^2$ denote P-Sp-.

Another aspect of the invention relates to a polymerisable LC material comprising one or more compounds of the present invention and optionally comprising one or more polymerisable compounds.

Another aspect of the present invention relates to an anisotropic polymer film obtainable from a polymerisable LC material as defined above that is aligned in its LC phase into macroscopically uniform orientation and polymerised or crosslinked to fix the oriented state.

The polymerisable compounds and mixtures according to the present invention are particularly useful as semiconductor, charge transport or light-emitting materials, as they can be aligned into uniform highly ordered orientation in their LC phase by known techniques, thus exhibiting a higher degree of order that leads to particularly high charge carrier mobility. The highly ordered LC state can be fixed by in situ polymerisation or crosslinking via the groups P to yield polymer films with high charge carrier mobility and high thermal, mechanical and chemical stability. The materials also emit light on the application of an electric field at a range of wavelengths, dependent on the exact molecular substitution. Additionally, the highly ordered LC state fixated in the anisotropic polymer film will give rise to an anisotropy of electroluminescence, with polarisation of that anisotropy corresponding to the long molecular axis of LC orientation.

The materials according to the present invention are ideally solution processable and are suitable as part of an OFET or OLED device in conjunction with hole and electron transport layers and suitable workfunction electrode structures.

For example, an OLED or OFET component can be made by in-situ polymerisation of a polymerisable LC material comprising one or more compounds of formula I2, wherein one or both of R$^1$ and R$^2$ denote P-Sp-. If an LC polymer is prepared first, for example by polymerisation in solution, and the isolated LC polymer is used to make the device, said LC polymer is preferably made from an LC material comprising one or more compounds of formula I wherein one of R$^1$ and R$^2$ denote P-Sp-.

Particularly preferred are LC materials having a nematic and/or smectic phase. For OFET applications smectic materials are especially preferred. For OLED applications nematic, chiral nematic or smectic materials are especially preferred.

It is also possible to copolymerise the polymerisable compounds or mixtures according to the present invention with other mesogenic or LC monomers that are known from prior art, in order to induce or enhance LC phase behaviour. Polymerisable mesogenic compounds that are suitable as comonomers are known in prior art and disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

Preferably the polymerisable LC mixture comprises at least one polymerisable mesogenic compound having one polymerisable functional group and at least one polymerisable mesogenic compound having two or more polymerisable functional groups.

The polymerisable LC mixtures according to the present invention may also comprise one or more non-reactive chiral dopants or chiral polymerisable mesogenic compounds. Typically used chiral dopants are e.g. the commercially available R— or S-811, R— or S-1011, R— or S-2011, R— or S-3011, R— or S-4011, R— or S-5011 or CB 15 (from Merck KGaA, Darmstadt, Germany). Very preferred are chiral compounds with a high helical twisting power (HTP), in particular compounds comprising a sorbitol group as described in WO 98/00428, compounds comprising a hydrobenzoin group as described in GB 2,328,207, chiral binaphthyl derivatives as described in WO 02/94805, chiral binaphthol acetal derivatives as described in WO 02/34739, chiral TADDOL derivatives as described in WO 02/06265, and chiral dopants with at least one fluorinated linkage group and a terminal or central chiral group as described in WO 02/06196 and WO 02/06195.

Preferably polymerisation is carried out as in-situ polymerisation of a coated layer of the material, preferably during fabrication of the electronic or optical device comprising the inventive semiconductor or light-emitting material.

In case of OFET manufacture, the LC materials are preferably aligned in their LC state into homeotropic orientation prior to polymerisation, where the conjugated pi-electron systems are orthogonal to the direction of charge transport. This ensures that the intermolecular distances are minimised and hence then energy required to transport charge between molecules is minimised. In case of use in OLED devices or e.g. optical films or alignment layers, other orientations like planar, tilted or splayed alignment may be preferred.

The oriented LC material is then polymerised or crosslinked to fix the uniform orientation of the LC state. Alignment and curing are carried out in the LC phase or mesophase of the material. This technique is known in the art and is generally described for example in D. J. Broer, et al., Angew. Makromol. Chem. 183, (1990), 45-66

Uniform alignment of the LC material can be achieved for example by treatment of the substrate onto which the material is coated, by shearing the material during or after coating, by application of a magnetic or electric field to the coated material, or by the addition of surface-active compounds to the liquid crystal material. Reviews of alignment techniques are given for example by I. Sage in "Thermotropic Liquid Crystals", edited by G. W. Gray, John Wiley & Sons, 1987, pages 75-77, and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Polymerisation takes place by exposure to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation at a non-absorbing wavelength. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

Polymerisation is preferably carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing for example polymerisable materials with acrylate or methacrylate groups, preferably a radical photoinitiator is used, when curing for example polymerisable materials with vinyl ether, epoxide and oxetane groups, preferably a cationic photoinitiator is used. It is also possible to use a polymerisation initiator that decomposes when heated to produce free radicals or ions that start the polymerisation. As a photoinitiator for radical polymerisation for example the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used.

The polymerisable material can additionally comprise one or more other suitable components such as, for example, catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

Another aspect of the invention relates to a liquid crystal side chain polymer (SCLCP) obtained from a polymerisable compound or mixture as defined above by polymerisation or polymeranaloguous reaction. Particularly preferred are SCLCPs obtained from one or more monomers of formula I1A or I2 wherein one or both of $R^1$ and $R^2$ or $R^{11}$ and $R^{12}$, respectively, are a polymerisable or reactive group, or from a polymerisable mixture comprising one or more of said monomers.

Another aspect of the invention relates to an SCLCP obtained from one or more compounds of formula I1A or I2 wherein one or both of $R^1$ and $R^2$ or $R^{11}$ and $R^{12}$, respectively, are a polymerisable group, or from a polymerisable LC mixture as defined above, by copolymerisation or polymer analogous reaction together with one or more additional mesogenic or non-mesogenic comonomers.

Side chain liquid crystal polymers or copolymers (SCLCPs), in which the semiconducting component is located as a pendant group, separated from a flexible backbone by an aliphatic spacer group, offer the possibility to obtain a highly ordered lamellar like morphology. This structure consists of closely packed conjugated aromatic mesogens, in which very close (typically <4 Å) pi-pi stacking can occur. This stacking allows intermolecular charge transport to occur more easily, leading to high charge carrier mobilities. SCLCPs are advantageous for specific applications as they can be readily synthesized before processing and then e.g. be processed from solution in an organic solvent. If SCLCPs are used in solutions, they can orient spontaneously when coated onto an appropriate surface and when at their mesophase temperature, which can result in large area, highly ordered domains.

SCLCPs can be prepared from the polymerisable compounds or mixtures according to the invention by the methods described above, or by conventional polymerisation techniques which are known to those skilled in the art, including for example radicalic, anionic or cationic chain polymerisation, polyaddition or polycondensation. Polymerisation can be carried out for example as polymerisation in solution, without the need of coating and prior alignment, or polymerisation in situ. It is also possible to form SCLCPs by grafting compounds according to the invention with a suitable reactive group, or mixtures thereof, to presynthesized isotropic or anisotropic polymer backbones in a polymer analogous reaction. For example, compounds with a terminal hydroxy group can be attached to polymer backbones with lateral carboxylic acid or ester groups, compounds with terminal isocyanate groups can be added to backbones with free hydroxy groups, compounds with terminal vinyl or vinyloxy groups can be added, e.g., to polysiloxane backbones with Si—H groups. It is also possible to form SCLCPs by copolymerisation or polymer analogous reaction from the inventive compounds together with conventional mesogenic or non mesogenic comonomers. Suitable comonomers are known to those skilled in the art. In principle it is possible to use all conventional comonomers known in the art that carry a reactive or polymerisable group capable of undergoing the desired polymer-forming reaction, like for example a polymerisable or reactive group P as defined above. Typical mesogenic comonomers are for example those mentioned in WO 93/22397, EP 0 261 712, DE 195 04 224, WO 95/22586, WO 97/00600 and GB 2 351 734. Typical non mesogenic comonomers are for example alkyl mono- or diacrylates or alkyl mono- or dimethacrylates with alkyl groups of 1 to 20 C atoms, like methyl acrylate or methyl methacrylate, trimethylpropane trimethacrylate or pentaerythritol tetraacrylate.

A further aspect of the invention relates to both the oxidised and reduced form of the oligo- and polymers of formula I1 and I1A. Either loss or gain of electrons results in formation of a highly delocalised ionic form, which is of high conductivity. This can occur on exposure to common dopants. Suitable dopants and methods of doping are known to those skilled in the art, e.g., from EP 0 528 662, U.S. Pat. No. 5,198,153 or WO 96/21659.

The doping process typically implies treatment of the semiconductor material with an oxidating or reducing agent in a redox reaction to form delocalised ionic centres in the material, with the corresponding counterions derived from the applied dopants. Suitable doping methods comprise for example exposure to a doping vapor in the atmospheric pressure or at a reduced pressure, electrochemical doping in a solution containing a dopant, bringing a dopant into contact with the semiconductor material to be thermally diffused, and ion-implantantion of the dopant into the semiconductor material.

When electrons are used as carriers, suitable dopants are for example halogens (e.g., $I_2$, $Cl_2$, $Br_2$, $IC_1$, $ICl_3$, $IBr$ and $IF$), Lewis acids (e.g., $PF_5$, $AsF_5$, $SbF_5$, $BF_3$, $BCl_3$, $SbCl_5$, $BBr_3$ and $SO_3$), protonic acids, organic acids, or amino acids (e.g., $HF$, $HCl$, $HNO_3$, $H_2SO_4$, $HClO_4$, $FSO_3H$ and $ClSO_3H$), transition metal compounds (e.g., $FeCl_3$, $FeOCl$, $Fe(ClO_4)_3$, $Fe(4\text{-}CH_3C_6H_4SO_3)_3$, $TiCl_4$, $ZrCl_4$, $HfCl_4$, $NbF_5$, $NbCl_5$, $TaCl_5$, $MoF_5$, $MoCl_5$, $WF_5$, $WCl_6$, $UF_6$ and $LnCl_3$ (wherein Ln is a lanthanoid), anions (e.g., $Cl^-$, $Br^-$, $I^-$, $I_3^-$, $HSO_4^-$, $SO_4^{2-}$, $NO_3^-$, $ClO_4^-$, $BF_4^-$, $PF_6^-$, $AsF_6^-$, $SbF_6^-$, $FeCl_4^-$, $Fe(CN)_6^{3-}$, and anions of various sulfonic acids, such as aryl-SOD. When holes are used as carriers, examples of dopants are cations (e.g., $H^+$, $L^{1+}$, $Na^+$, $K^+$, $Rb^+$ and $Cs^+$), alkali metals (e.g., $L^1$, Na, K, Rb, and Cs), alkaline-earth metals (e.g., Ca, Sr, and Ba), $O_2$, $XeOF_4$, $(NO_2^+)$ $(SbF_6^-)$, $(NO_2^+)$ $(SbCl_6^-)$, $(NO_2^+)$ $(BF_4^-)$, $AgClO_4$, $H_2IrCl_6$, La $(NO_3)_3 \cdot 6H_2O$, $FSO_2OOSO_2F$, Eu, acetylcholine, $R_4N^+$, (R is an alkyl group), $R_4P^+$ (R is an alkyl group), $R_6As^+$ (R is an alkyl group), and $R_3S^+$ (R is an alkyl group).

The conducting form of the compounds and materials of the present invention can be used as an organic "metal" in applications, for example, but not limited to, charge injection layers and ITO planarising layers in organic light emitting diode applications, films for flat panel displays and touch screens, antistatic films, printed conductive substrates, patterns or tracts in electronic applications such as printed circuit boards and condensers.

The compounds, mixtures and polymers of the present invention are useful as optical, electronic, semiconductor or light-emitting materials, in particular as charge transport materials in OFETs as components of ICs, RFID tags or TFTs, and as light-emitting materials for OLEDs in electroluminescent display applications or as backlight of for example LCDs. Alternatively, they may be used as photovoltaics or sensor materials, for electrophotographic recording, and for other semiconductor applications.

The compounds, mixtures and polymers according to the invention are especially useful as charge transport or semiconductor materials, or as components of such materials, that have high carrier mobilities. Particularly preferred are materials of formula I1, I1A and I2 wherein $R^{5-10}$ are selected from alkyl, alkoxy, thioalkyl or fluoroalkyl groups. The introduction of such lateral side chains $R^{5-10}$ into the anthracene group improves their solubility and therefore their solution processibility. Furthermore, the presence of such side chains also renders these materials effective as n-type semiconductors. The electron-withdrawing nature of fluoroalkyl substituents will also lower the HOMO further and result in a more stable material, which is less susceptible to oxidation.

The polymers according to the invention show advantageous solubility properties which allow production processes using solutions of these compounds. Thus films, including layers and coatings, may be generated by low cost production techniques, e.g., spin coating. Suitable solvents or solvent mixtures comprise alkanes and/or aromatics, especially their fluorinated derivatives.

Semiconductor devices like OFETs, where an organic semiconductive material is arranged as a film between a gate-dielectric and a drain and a source electrode, are generally known in prior art and described for example in U.S. Pat. No. 5,892,244, WO 00/79617, U.S. Pat. No. 5,998,804. Due to the advantages, like low cost production using the solubility properties of the compounds according to the invention and thus the processibility of large surfaces, preferred applications of these FETs are such as integrated circuitry, TFT-displays and security applications.

In security applications, OFETs and other devices with semiconductive materials, like transistors or diodes, may be used for ID tags or security markings to authenticate and prevent counterfeiting of documents of value like banknotes, credit cards or ID cards, national ID documents, licenses or any product with money value, like stamps, tickets, shares, cheques etc.

The materials according to the invention may also be used as a means to produce macroscopically aligned electroluminescent layers, for example in organic light emitting devices or diodes (OLEDs). Such OLEDs can be used as emitters of linear or circular polarized light, suitable in display applications or as backlight of liquid crystal displays, security elements, antiglare lighting elements, horticultural lighting elements etc.

Common OLEDs are typically realized using multilayer structures. An emission layer is generally sandwiched between one or more electron-transport and/or hole-transport layers. By applying a voltage, electrons and holes as charge carriers move towards the emission layer where their recombination leads to the excitation and hence luminescence of the lumophor units contained in the emission layer. The inventive compounds, materials and films may be employed in one or more of the charge transport layers and/or in the emission layer, corresponding to their electrical and/or optical properties. Furthermore their use within the emission layer is especially advantageous, if the compounds, materials and films according to the invention show electroluminescent properties themselves or comprise electroluminescent groups or compounds. The selection, characterization as well as the processing of suitable monomeric, oligomeric and polymeric compounds or materials for the use in OLEDs is generally known by a person skilled in the art, see, e.g., Meerholz, Synthetic Materials, 111-112, 2000, 31-34, Alcala, J. Appl. Phys., 88, 2000, 7124-7128 and the literature cited therein.

According to another use, the inventive compounds, materials or films, especially those which show photoluminescent properties, may be employed as materials of light sources, e.g., of display devices such as described in EP 0 889 350 A1 or by C. Weder et al., Science, 279, 1998, 835-837.

According to another use, the inventive compounds, materials or films can be used alone or together with other materials in or as alignment layers in LCD or OLED devices, as described for example in US 2003/0021913. The use of charge transport compounds according to the present invention can increase the electrical conductivity of the alignment layer. When used in an LCD, this increased electrical conductivity can reduce adverse residual dc effects in the switchable LCD cell and suppress image sticking or, for example in ferroelectric LCDs, reduce the residual charge produced by the switching of the spontaneous polarisation charge of the ferroelectric LCs. When used in an OLED device comprising a light emitting material provided onto the alignment layer, this increased electrical conductivity can enhance the electroluminescence of the light emitting material. The compounds or materials according to the present invention having mesogenic or liquid crystalline properties can form oriented anisotropic films as described above, which are especially useful as alignment layers to induce or enhance alignment in a liquid crystal medium provided onto said anisotropic film. The materials according to the present invention may also be combined with photoisomerisable compounds and/or chromophores for use in or as photoalignment layers, as described in US 2003/0021913.

The examples below serve to illustrate the invention without limiting it. In the foregoing and the following, all temperatures are given in degrees Celsius, and all percentages are by weight, unless stated otherwise. The following abbreviations are used to illustrate the liquid crystalline phase behaviour of the compounds: K=crystalline; N=nematic; S=smectic; N*, Ch=chiral nematic or cholesteric; I=isotropic. The numbers between these symbols indicate the phase transition temperatures in degree Celsius.

Example 1

Synthesis of 2,6-di-4'-(2'-Fluoro 4-n-propylbiphenyl)-9,10-didecoxyanthracene. (Compound I)

Compound (1) was prepared as shown below.

Step 1

$CuBr_2$ (200 g, 0.857 moles), 90% $^tBuNO_2$ (186 ml, 1.40 moles) and MeCN (3000 ml) were added together and heated to 60° C. with rapid stirring. 2,6-diaminoanthraquinone (100 g, 0.420 moles) was added dropwise as a semi-solid solution in MeCN (1000 ml). $N_2$ and $Br_2$ were evolved and the reaction mixture turned black (CuO) with a 6° C. exotherm. A brown solid was filtered off and then partially redissolved at reflux in cyclohexanone (4 lt) and the hot solution was gravity filtered through at 100° C. using a ceramic filter. The preparation was repeated at the same scale six times to yield 205 g of crude product. The combined batches were recrystallisedwith hot filtration using cyclohexanone to yield 180 g of pure product. GC/MS analysis showed a pure product with a mass ion (M+366) together with trace amounts of a tribrominated an monobrominated impurities. Proton NMR spectroscopy confirmed the structure.

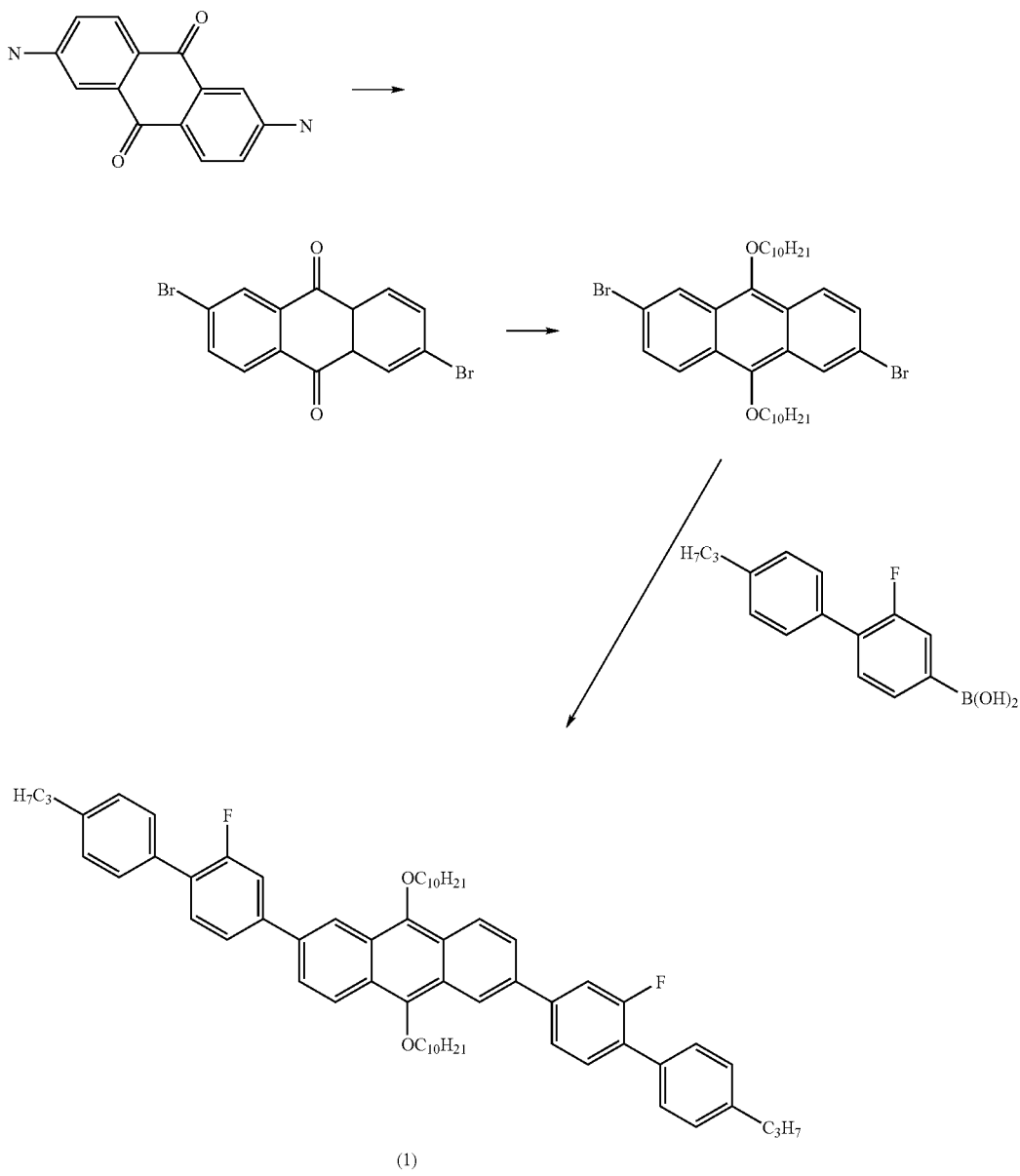

Step 2

2,6-dibromoanthraquinone (30 g, 0.0819 moles), sodium dithionite (31 g, 0.18 moles), sodium hydroxide 12 g, 0.3 moles), Tetrabutylammoniumiodide (7.2 g, 0.00324 moles), demineralised water (30 ml) & cyclohexanone (500 ml), were heated under reflux at 97° C. for 5 hours under a nitrogen atmosphere. The reaction mixture turned from purple to dark brown, and a precipitate of the anthraquinone disodium salt appeared.

A solution of 1-bromo-decane (37.5 ml, 0.180 moles) was added at 60° C. to the reaction mixture, together with an additional 50 mls of demineralised water, to redissolve the disodium salt. The reaction mixture was then heated at reflux for a further 24 hours. The crude product was isolated by conventional extraction and aqueous workup to yield 26 g of material. The crude material was purified by recrystallisation from ethyl acetate, to yield pure 2,6-dibromo-9,10-didecoxy-anthracene as a pale yellow solid.

Step 3

2,6-dibromo-9,10-didecoxyanthracene (4 g, 6.167 mmoles), 2'-Fluoro 4-n-propylbiphenyl-4'-boronic acid (3.3 g, 12.786 mmoles), sodium carbonate (1.5 g, 14.151 mmoles), 1,1 Bis diphenylphosphino ferrocene di chloro palladium (II) (0.2 g, 0.245 mmoles) and 1,4-dioxane (20 ml) were combined under a nitrogen atmosphere and heated at 70° C. for 18 hours. The reaction mixture went a dark blue colour and was added to methanol. The precipitate was filtered filtered off and the organic portion was extracted using warm THF, and the THF solution was filtered through a glass fibre filter mat. The crude product was precipitated with methanol & washed with 40-60 petrol.

The crude product was purified by column chromatography, eluting over silica with a 95:5 petrol:ethyl acetate mixture, increasing the eluent strength with THF. The chromatographed product was recrystallised from an IPA-THF mixture to yield 2,6-di-4'-(2'-Fluoro 4-n-propylbiphenyl)-9,10-didecoxyanthracene, a bright yellow pure material. 2.2 g yield. Proton NMR spectroscopy and GC-MS confirmed the structure.

The pure compound exhibits the following mesophase behaviour

K 148 N 215 I heating

I 213 N 137 K cooling

Example 2

Synthesis of 2,6-bis(1-(4-[7-(1-vinyl-allyloxy-carbonyl)heptyloxy]phenyl)-9,10-didecoxyanthracene Compound (2) was prepared as shown below.

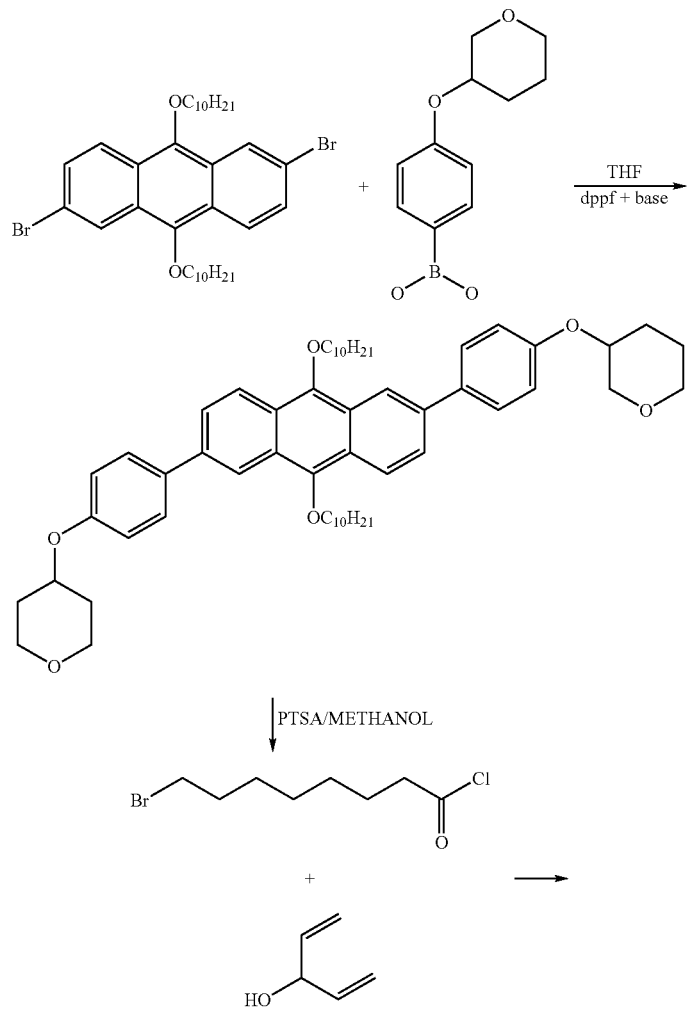

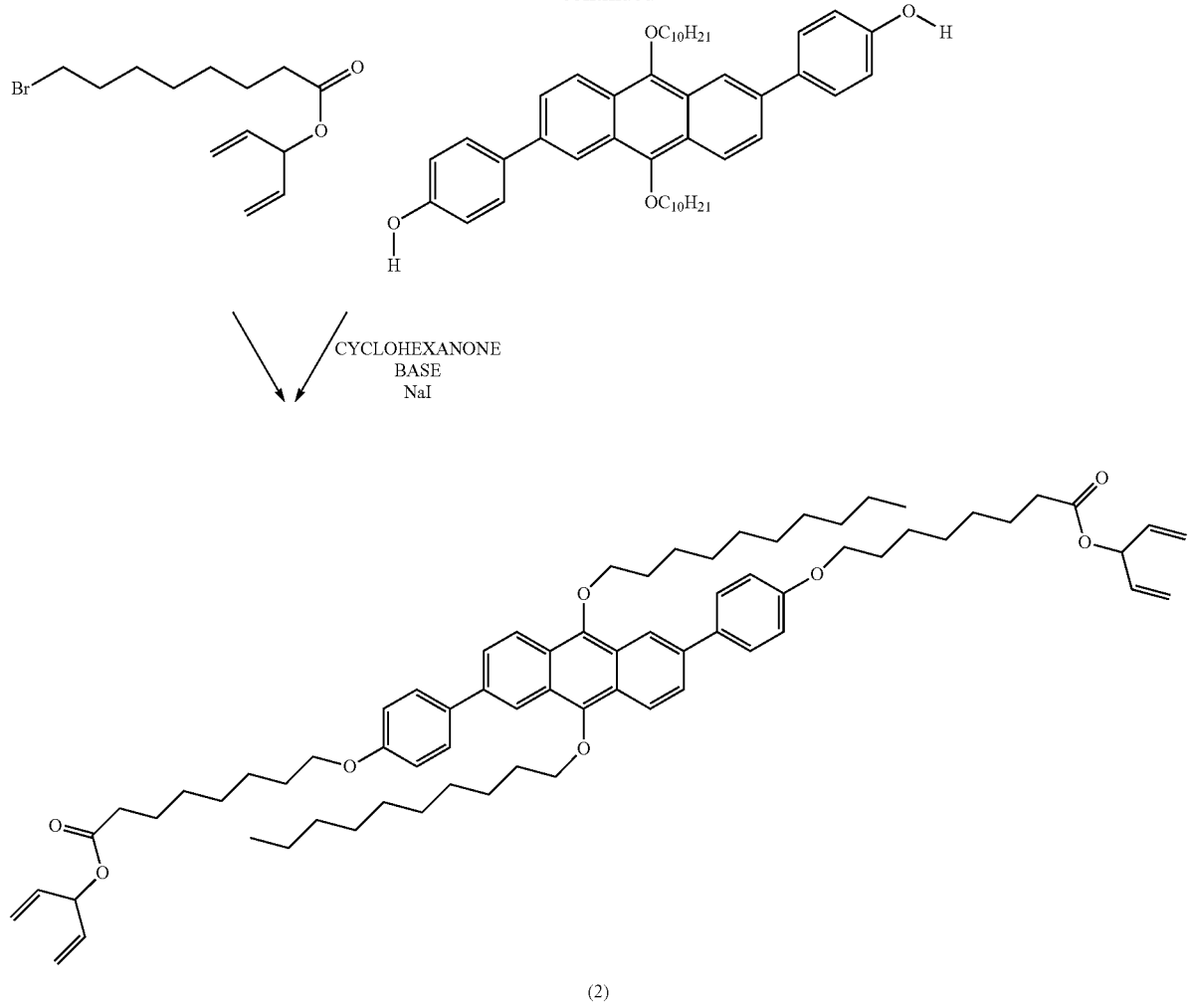

(2)

Step 1

2,6-dibromo-9,10-didecoxyanthracene (6 g, 9.125 mmoles), 4-dihydropyranyloxyboronic acid (4.4 g, 20 mmoles), sodium carbonate (5.2 g, 49.7 mmoles), 1,1 Bis diphenylphosphino ferrocene di chloro palladium (II) (0.56 g, 0.696 mmoles) THF (150 ml) & demineralised water (10 ml) were combined under a nitrogen atmosphere and heated at reflux for 18 hours.

Crude 2,6-di-4-(4-dihydropyranyloxyphenyl)-9,10-didecoxyanthracene precipitated from the reaction mixture and was filtered off. The crude product was used without further purification. Yield 5 g.

Step 2

2,6-di-4-(4-dihydropyranyloxyphenyl)-9,10-didecoxyanthracene (5 g, 5.930 mmol), was dissolved in a methanol/THF mixture (1:5 500 ml). p-toluenesulphonic acid (4 g) was added and the reaction mixture was heated with stirring to 30° C. o/n. The resultant solution was evaporated to low volume and the crude product was precipitated with ethanol/water, filtered off and washed with ethanol to yield pure 2,6-di-4-(4-hydroxyphenyl)-9,10-didecoxyanthracene 4 g, Proton NMR spectroscopy and GC-MS confirmed the structure.

Step 3

2,6-di-4-(4-hydroxyphenyl)-9,10-didecoxyanthracene (3.0 g, 4.44 mmol), potassium iodide (1.499 g, 10 mmol), potassium carbonate 2.7 g, 20 mmol), Tetrabutylammoniumiodide (0.2 g) & butanone (100 ml), were heated to reflux @ 80° C. A solution of 7-bromoheptanoic acid, 2-hydroxy-1,3-pentadienyl ester (2.89 g, 10 mmol) was added to the reaction mixture, and refluxed overnight. The crude product was isolated by conventional extraction and aqueous workup. The crude product was purified by column chromatography, eluting over silica with a 90:10 petrol:ethyl acetate mixture. The chromatographed product was recrystallised from an IPA-THF mixture to yield, 2,6-bis(1-(4-[7-(1-vinyl-allyloxy-carbonyl)heptyloxy]phenyl)-9,10-didecoxyanthracene as an off white-yellow material. 2.2 g yield (20%). Proton NMR spectroscopy and GC-MS confirmed the structure.

The pure material exhibited a melting point of 133° C.

Example 3

Synthesis of 2,6-bis(1-(4-[7-(1-vinyloxy)hexyloxy]phenyl)-9,10-didecoxyanthracene Compound (3) was prepared as shown below.

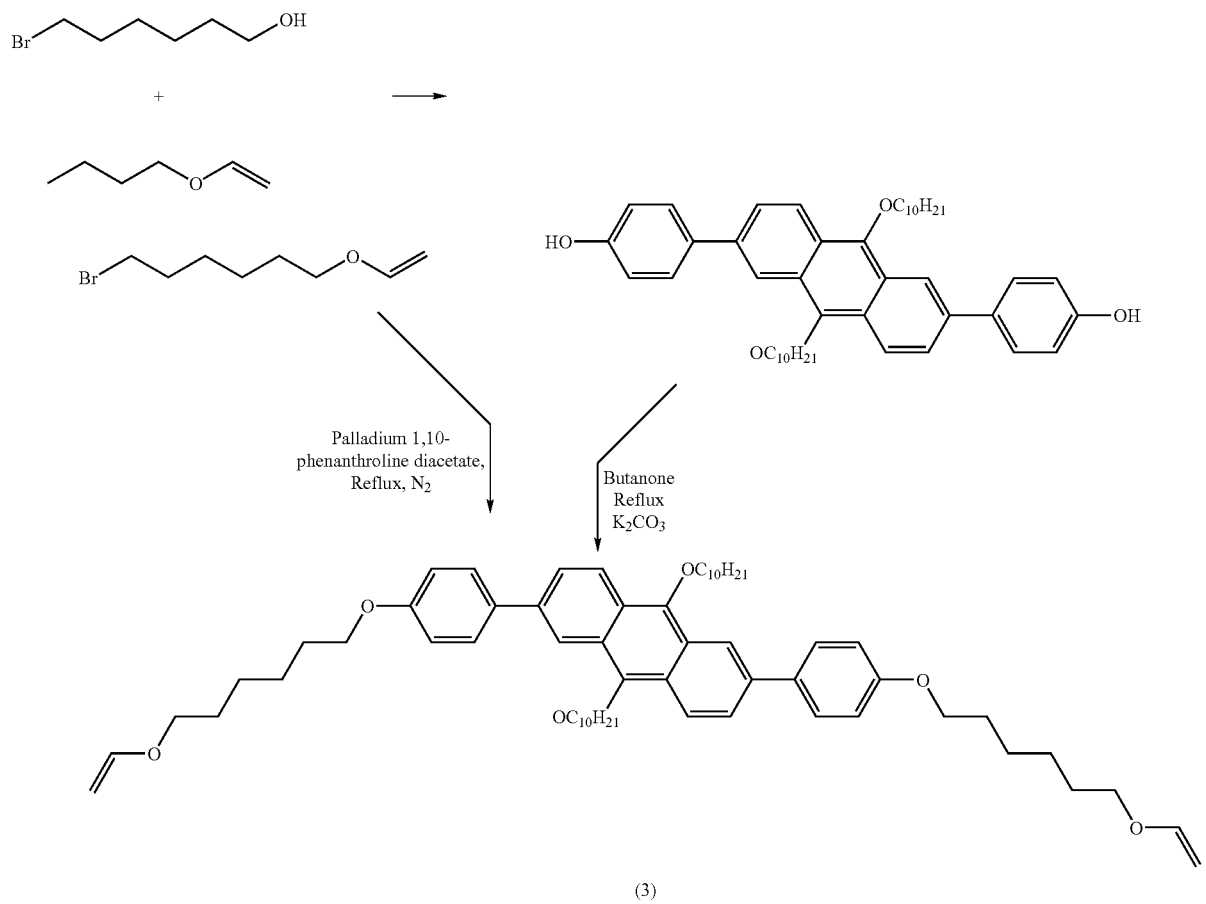

(3)

Step 1

6-bromo-1-vinyloxyhexane was prepared according to the method of Percec et al as described in Polymer Bulletin 1991, 26, 15-22.

Step 2

Compound (3) was prepared in an analogous procedure to that of compound (2)

2,6-di-4-(4-hydroxyphenyl)-9,10-didecoxyanthracene (3.0 g, 4.44 mmol), potassium iodide (1.499 g, 10 mmol), potassium carbonate 2.7 g, 20 mmol), Tetrabutylammoniumiodide (0.2 g) & butanone (100 ml), were heated to reflux @ 80° C. A solution of 6-bromo-1-vinyloxyhexane (5 g, 24 mmol) was added to the reaction mixture, and refluxed overnight. The crude product was isolated by conventional extraction and aqueous workup. The crude product was purified by column chromatography, eluting over silica with a 90:10 petrol:ethyl acetate mixture. The chromatographed product was recrystallised from an IPA-THF mixture to yield, 2,6-bis(1-(4-[7-(1-vinyloxy)hexyloxy]phenyl)-9,10-didecoxyanthracene as an off white-yellow material. 0.6 g yield (6%). Proton NMR spectroscopy and GC-MS confirmed the structure.

The pure material exhibited a melting point of 131° C.

The invention claimed is:

1. A compound comprising identical or different groups of formula I1

$$-[(G)_g\text{-}(A)_a]_z\text{-} \qquad \text{I1}$$

wherein

G is, in case of multiple occurrence independently of one another,

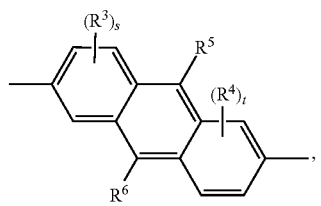

-continued

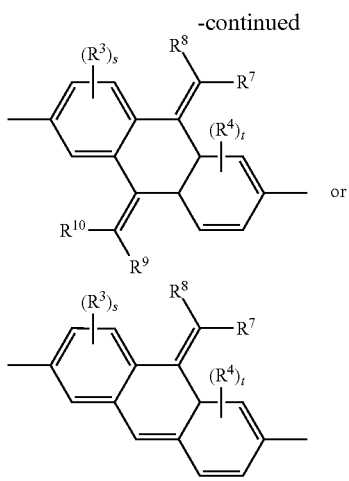

or

R$^3$ to R$^6$ are, independently of each other, F, Cl, Br, I, CN, NO$_2$, NCS, SF$_5$ or a straight chain or branched alkyl having 1 to 30 C-atoms that is unsubstituted, mono- or poly-substituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, or are P-Sp, R$^7$ to R$^{10}$ are, independently of each other, F, Cl, Br, I, NO$_2$, NCS, SF$_5$ or a straight chain or branched alkyl having 1 to 30 C-atoms that is unsubstituted, mono- or poly-substituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, or are P-Sp, R$^0$ and R$^{00}$ are independently of each other H or alkyl with 1 to 12 C-atoms, P is a polymerizable or reactive group, Sp is a spacer group or a single bond, s and t are independently of each other 0, 1, 2 or 3, g is, in case of multiple occurrence independently of one another, 1, 2 or 3, A is, in case of multiple occurrence independently of one another, —CX$^1$=CX$^2$—, —C≡C—, or furane-2,5-diyl, thiophene-2,5-diyl, thienothiophene-2,5-diyl, dithienothiophene-2,6-diyl, pyrrol-2,5-diyl, 1,4-phenylene, azulene-2,6-diyl, pyridine-2,5-diyl, pyrimidine-2,5-diyl, naphthalene-2,6-diyl, 1,2,3,4-tetrahydronaphthalene-2,6-diyl, indane-2,5-diyl, 1,4-cyclohexylene, in which 1,4-cyclohexylene one or two non-adjacent CH$_2$ groups are optionally replaced by O and/or S, oxazole, thiazole, thiadiazole, imidazole, pyrazine, phenanthrene, or alkyl fluorene, which are optionally mono- or polysubstituted by R$^3$, X$^1$ and X$^2$ are independently of each other H, F, Cl or CN, Y$^1$ and Y$^2$ are independently of each other H, F, Cl or CN, a is, in case of multiple occurrence independently of one another, 0 or 1, and z is an integer of 2 to 5000, wherein the groups [(G)$_g$-(A)$_a$] can be identical or different, and wherein in at least one recurring unit [(G)$_g$(A)$_a$] g=a=1.

2. A compound of formula I1A $$R^1\text{-}[(G)_g\text{-}(A)_a]_z\text{-}R^2 \qquad \text{I1A}$$

wherein

G is, in case of multiple occurrence independently of one another,

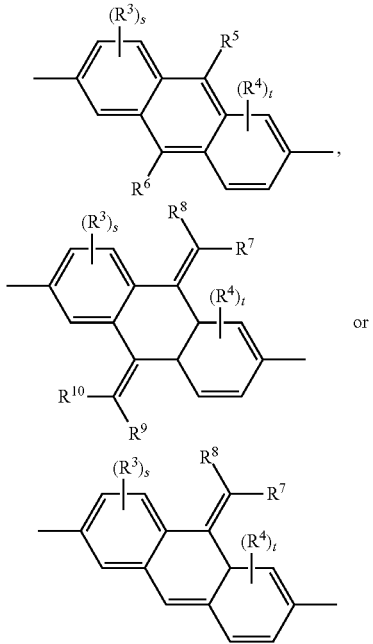

or

R$^3$ to R$^4$ are, independently of each other, F, Cl, Br, I, CN, NO$_2$, NCS, SF$_5$ or a straight chain or branched alkyl having 1 to 30 C-atoms that is unsubstituted, mono- or poly-substituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, or are P-Sp, R$^5$ to R$^6$ are, independently of each other, F, I, NO$_2$, NCS, SF$_5$ or a straight chain or branched alkyl having 1 to 30 C-atoms that is unsubstituted, mono- or poly-substituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, or are P-Sp, R$^7$ to R$^{10}$ are, independently of each other, F, Cl, Br, I, NO$_2$, NCS, SF$_5$ or a straight chain or branched alkyl having 1 to 30 C-atoms that is unsubstituted, mono- or poly-substituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, or are P-Sp, $R^O$ and $R^{OO}$ are independently of each other H or alkyl with 1 to 12 C-atoms, P is a polymerizable or reactive group, Sp is a spacer group or a single bond, s and t are independently of each other 0, 1, 2 or 3, g is, in case of multiple occurrence independently of one another, 1, 2 or 3, A is, in case of multiple occurrence independently of one another, —$CX^1$=$CX^2$—, —C≡C—, or furane-2,5-diyl, thiophene-2,5-diyl, thienothiophene-2,5-diyl, dithienothiophene-2,6-diyl, pyrrol-2,5-diyl, 1,4-phenylene, azulene-2,6-diyl, pyridine-2,5-diyl, pyrimidine-2,5-diyl, naphthalene-2,6-diyl, 1,2,3,4-tetrahydro-naphthalene-2,6-diyl, indane-2,5-diyl, 1,4-cyclohexylene, in which 1,4-cyclohexylene one or two non-adjacent $CH_2$ groups are optionally replaced by O and/or S, oxazole, thiazole, thiadiazole, imidazole, pyrazine, phenanthrene, or alkyl fluorene, which are optionally mono- or polysubstituted by $R^3$, $X^1$ and $X^2$ are independently of each other H, F, Cl or CN, $Y^1$ and $Y^2$ are independently of each other H, F, Cl or CN, a is, in case of multiple occurrence independently of one another, 0 or 1, z is an integer ≧1, $R^1$ and $R^2$ are, independently of each other, F, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^O$—, —$SiR^OR^{OO}$—, —CO—, —COO—, —OCO—, —OCO—O—, —S—CO—, —CO—S—, —$CY^1$=$CY^2$— or —C≡C— in such a manner that O and/or S atoms are not linked directly to one another, P-Sp, B(O$R^{x'}$)(O$R^{x''}$), Sn$R^xR^{xx}R^{xxx}$ or Si$R^xR^{xx}R^{xxx}$, $R^x$, $R^{xx}$ and $R^{xxx}$ are, independently of each other, H, aryl or alkyl with 1 to 12 C-atoms, and $R^{x'}$ and $R^{x''}$ are, independently of each other, H or alkyl with 1 to 12 C-atoms, or O$R^{x'}$ and O$R^{x''}$ together with the boron atom form a cyclic group having 2 to 10 C atoms, wherein in at least one recurring unit [$(G)_g$-$(A)_a$] g=a=1.

3. A compound of formula I2

$$R^{11}\text{-}(A^1\text{-}Z^1)_m\text{-}(G^1)_u\text{-}Z^3\text{-}(A^3\text{-}Z^4)_q\text{-}(G^2)_v\text{-}(Z^2\text{-}A^2)_n\text{-}R^{12} \quad \text{I2}$$

wherein $G^1$ and $G^2$ are, independently of each other and in case of multiple occurrence of either $G^1$ and/or $G^2$ each of such $G^1$ and $G^2$ independently of one another,

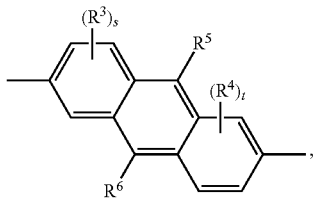

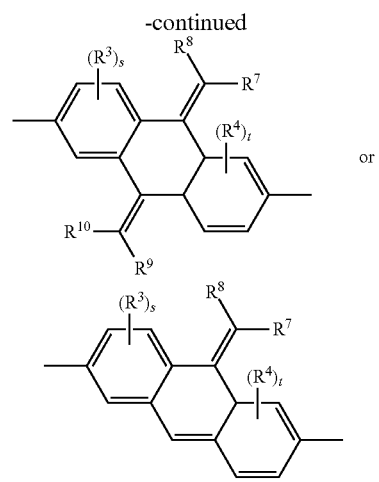

$R^3$ to $R^4$ and $R^{10}$ are, independently of each other, F, Cl, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^O$—, —$SiR^OR^{OO}$—, —CO—, —COO—, —OCO—, —OCO—O—, —S—CO—, —CO—S—, —$CY^1$=$CY^2$— or —C≡C— in such a manner that O and/or S atoms are not linked directly to one another, or are P-Sp, $R^{11}$ and $R^{12}$ are, independently of each other, F, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^O$—, —$SiR^OR^{OO}$—, —CO—, —COO—, —OCO—, —OCO—O—, —S—CO—, —CO—S—, —$CY^1$=$CY^2$— or —C≡C— in such a manner that O and/or S atoms are not linked directly to one another, or are P-Sp, $R^5$ to $R^6$ are, independently of each other, F, I, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^O$—, —$SiR^OR^{OO}$—, —CO—, —COO—, —OCO—, —OCO—O—, —S—CO—, —CO—S—, —$CY^1$=$CY^2$— or —C≡C— in such a manner that O and/or S atoms are not linked directly to one another, or are P-Sp, $R^7$ to $R^{10}$ are, independently of each other, F, Cl, Br, I, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^O$—, —$SiR^OR^{OO}$—, —CO—, —COO—, —COO—, —COO—O—, —S—CO—, —CO—S—, —$CY^1$=$CY^2$— or —C≡C— in such a manner that O and/or S atoms are not linked directly to one another, or are P-Sp, $R^O$ and $R^{OO}$ are independently of each other H or alkyl with 1 to 12 C-atoms, P is a polymerizable or reactive group, Sp is a spacer group or a single bond, s and t are independently of each other 0, 1, 2 or 3, $A^1$ to $A^3$ are, independently of each other and in case of multiple occurrence of any of $A^1$ to $A^3$ each of such $A^1$ to $A^3$ independently of one another, —$CX^1$=$CX^2$—, —C≡C—, or furane-2,5-diyl, thiophene-2,5-diyl, thienothiophene-2,5-diyl, dithienothiophene-2,6-diyl, pyrrol-2,5-diyl, 1,4-phenylene, azulene-2,6-diyl, pyridine-2,5-diyl, pyrimidine-2,5-diyl, naphthalene-2,6-diyl, 1,2,3,4-tetrahydro-naphthalene-2,6-diyl, indane-2,5-diyl, 1,4-cyclohexylene, in which 1,4-cyclohexylene one or two non-adjacent $CH_2$ groups are optionally replaced by O and/or S, oxazole, thiazole, thiadiazole, imidazole, pyrazine, phenanthrene, or alkyl fluorene, which are optionally mono- or polysubstituted by $R^3$, $X^1$ and $X^2$ are independently of each other H, F, Cl or CN, $Z^1$ to $Z^4$ are, independently of each other, —O—, —S—, —CO—, —COO—, —OCO—, —S—CO—, —CO—S—, —O—COO—, —CO—$NR^0$—, —$NR^0$—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=N—, —N=CH—, —N=N—, —CH=$CR^0$—, —$CY^1$=$CY^2$—, —C≡C—, —CH=CH—COO—, —OCO—CH=CH— or a single bond, $Y^1$ and $Y^2$ are independently of each other H, F, Cl or CN, m, n and q are independently of each other 0, 1, 2 or 3, wherein at least one of m, n and q is 1, 2 or 3, and u and v are independently of each other 0, 1 or 2, with u+v>0.

4. A compound according to claim 2, wherein z is an integer of 2 to 5000.

5. A compound according to claim 2, wherein z is an integer of 1 to 15.

6. A compound according to claim 2, wherein one or both of $R^1$ and $R^2$ denote P-Sp-.

7. A compound according to claim 1, wherein $R^3$ and $R^4$ are, each independently, F, Cl, CN, alkyl, oxaalkyl, alkoxy, alkylcarbonyl or alkoxycarbonyl with 1 to 15 C-atoms or alkenyl, alkenyloxy or alkynyl with 2 to 15 C-atoms.

8. A compound according to claim 1, wherein $R^{5-6}$ are, each independently, F, Cl, CN, $C_1$-$C_{20}$-alkyl that is optionally substituted with one or more fluorine atoms, $C_2$-$C_{20}$-alkenyl, $C_2$-$C_{20}$-alkynyl, alkoxy, $C_1$-$C_{20}$-thioalkyl, $C_1$-$C_{20}$-silyl, $C_1$-$C_{20}$-ester, $C_1$-$C_{20}$-amino, $C_1$-$C_{20}$-fluoroalkyl, or $(CH_2CH_2O)_m$ with m being an integer of 1 to 6, and $R^{7-10}$ are each independently, F, Cl, $C_1$-$C_{20}$-alkyl that is optionally substituted with one or more fluorine atoms, $C_2$-$C_{20}$-alkenyl, $C_2$-$C_{20}$-alkynyl, $C_1$-$C_{20}$-alkoxy, $C_1$-$C_{20}$-thioalkyl, $C_1$-$C_{20}$-silyl, $C_1$-$C_{20}$-ester, $C_1$-$C_{20}$-amino, $C_1$-$C_{20}$-fluoroalkyl, or $(CH_2CH_2O)_m$ with m being an integer of 1 to 6.

9. A compound according to claim 1, wherein P is a vinyl ether, propenyl ether or oxetane group.

10. A compound, which includes a group of formula Ia, Ib, Id, Ih, Ii, Im, In or Io

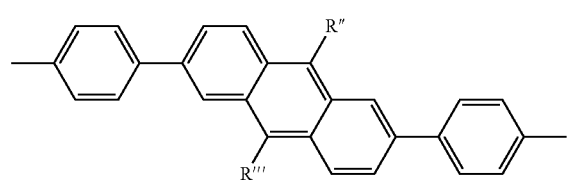

Ia

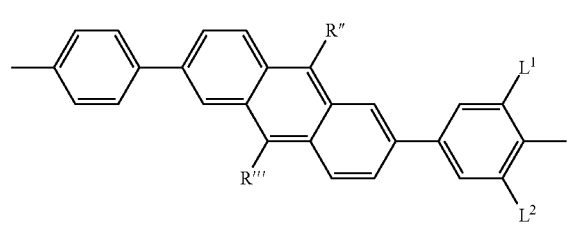

Ib

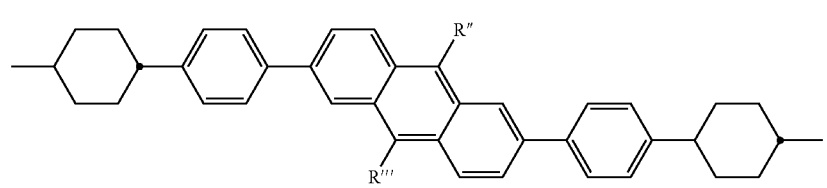

Id

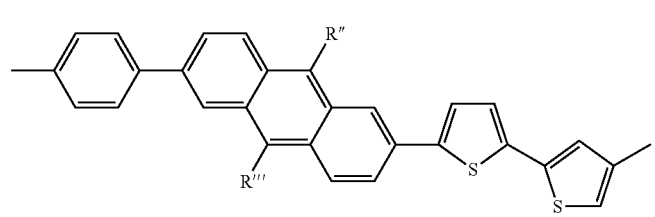

Ih

-continued

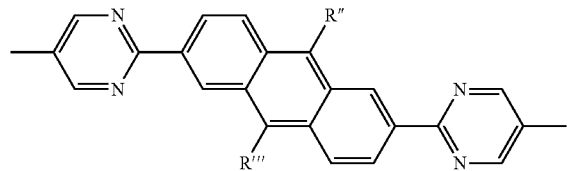

Ii

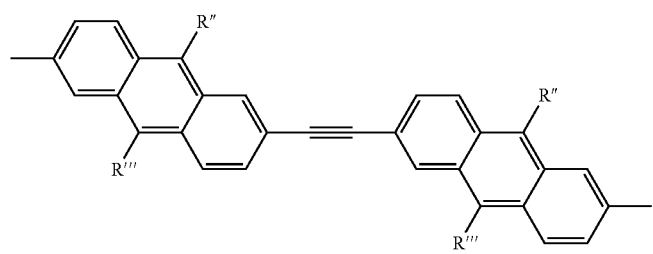

Im

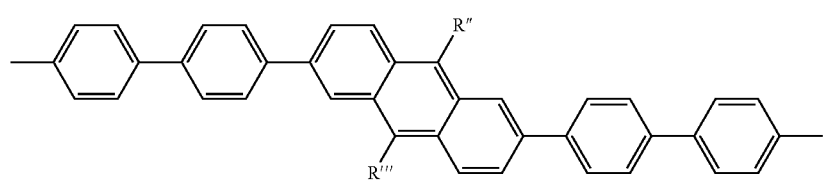

In

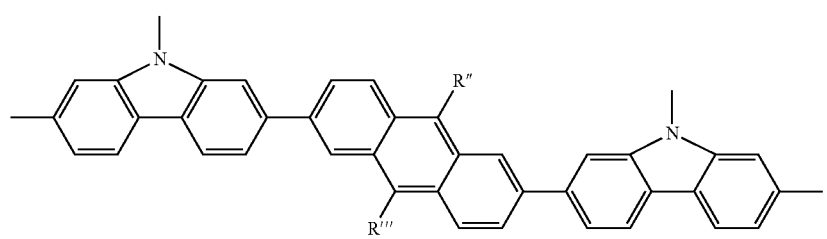

Io wherein

R″ and R‴ are, independently of each other, F, Cl, Br, I, CN, NO₂, NCS, SF₅ or a straight chain or branched alkyl having 1 to 30 C-atoms that is unsubstituted, mono- or poly-substituted by F, Cl, Br, I or CN, and in which one or more non-adjacent CH₂ groups are optionally replaced, in each case independently from one another, by —O—, —S—, —NH—, —NR⁰—, —SiR⁰R⁰⁰—, —CO—, —COO—, —OCO—, —OCO—O—, —S—CO—, —CO—S—, —CY¹=CY²— or —C≡C— in such a manner that O and/or S atoms are not linked directly to one another, or are P-Sp, R⁰ and R⁰⁰ are independently of each other H or alkyl with 1 to 12 C-atoms, and Y¹ and Y² are independently of each other H, F, Cl or CN, L¹ and L² are independently of each other H or F, P is a polymerizable or reactive group, and Sp is a spacer group or a single bond, and the aromatic rings are optionally substituted with 1, 2 or 3 F, Cl, Br, I, CN, NO₂, NCS, SF₅ or a straight chain or branched alkyl having 1 to 30 C-atoms that is unsubstituted, mono- or poly-substituted by F, Cl, Br, I or CN, and in which one or more non-adjacent CH₂ groups are optionally replaced, in each case independently from one another, by —O—, —S—, —NH—, —NR⁰—, —SiR⁰R⁰⁰—, —CO—, —COO—, —OCO—, —OCO—O—, —S—CO—, —CO—S—, —CY¹=CY²— or —C≡C— in such a manner that O and/or S atoms are not linked directly to one another, or with P-Sp.

11. A compound, which is of one of the following formulae

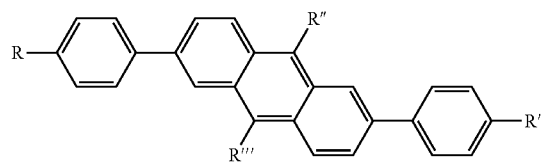

I2a

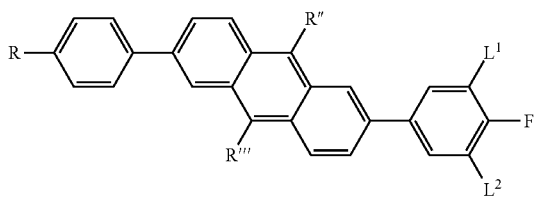

I2b

-continued
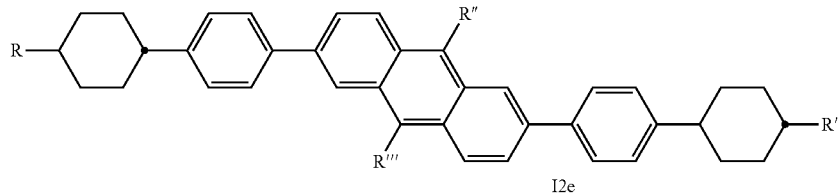
I2d
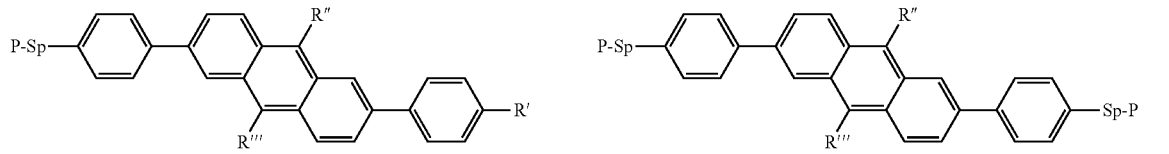
I2e    I2f
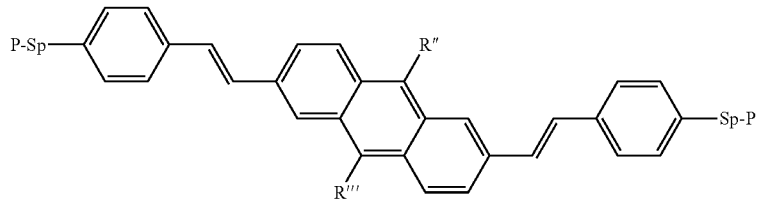
I2g
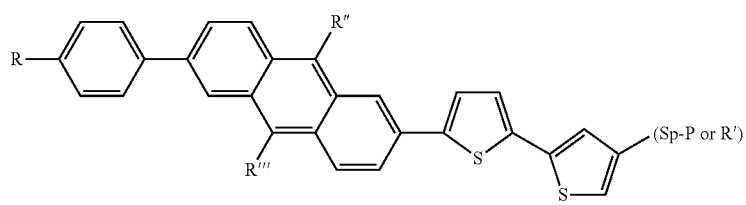
I2h
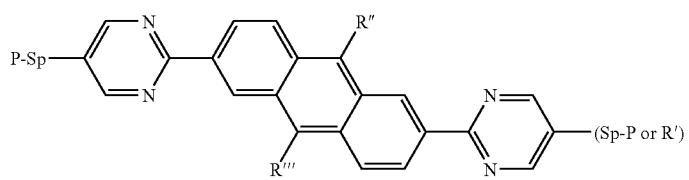
I2i
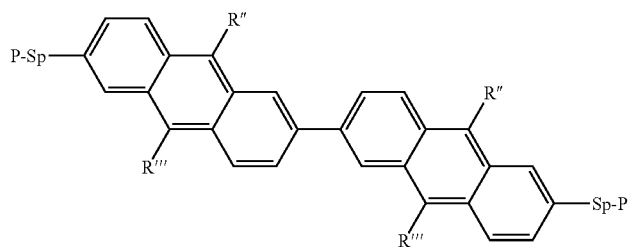
I2k
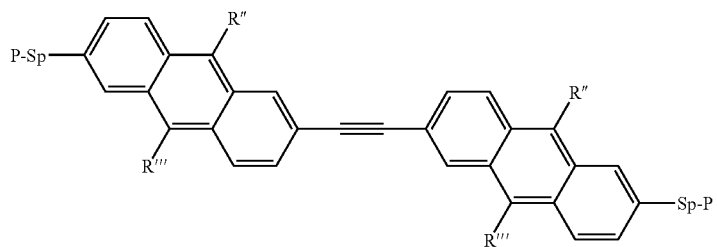
I2m
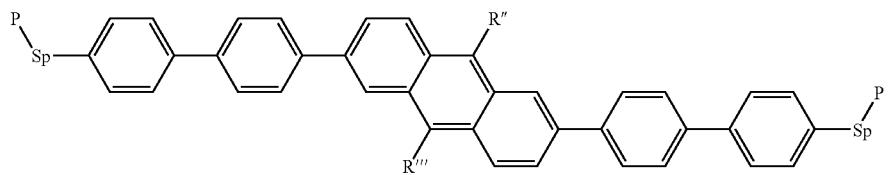
I2n

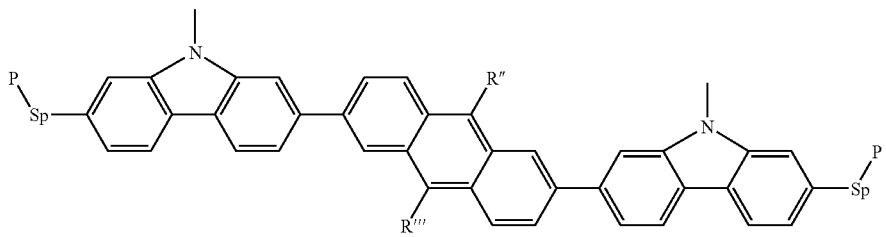

wherein

P is $CH_2=CW^1-COO-$,

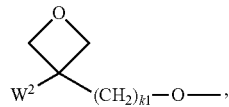

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $HS-CW^2W^3-$, $CH_2=CW^1-CO-NH-$, $CH_2=CH-(COO)_{k1}$-Phe-$(O)_{k2}-$, $OCN-$, or $W^4W^5W^6Si-$, with $W^1$ being H, Cl, CN, phenyl or alkyl with 1 to 5 C-atoms, $W^2$ and $W^3$ being independently of each other H or alkyl with 1 to 5 C-atoms, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1

Sp is a spacer group or a single bond,

R and R' are, independently of each other, F, Cl, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by $-O-$, $-S-$, $-NH-$, $-NR^0-$, $-SiR^0R^{00}-$, $-CO-$, $-COO-$, $-OCO-$, $-OCO-O-$, $-S-CO-$, $-CO-S-$, $-CY^1=CY^2-$ or $-C\equiv C-$ in such a manner that O and/or S atoms are not linked directly to one another, or are P-Sp, $B(OR^{x'})(OR^{x''})$, $SnR^xR^{xx}R^{xxx}$ or $SiR^xR^{xx}R_{xxx}$, $R^x$, $R^{xx}$ and $R^{xxx}$ are, independently of each other, H, aryl or alkyl with 1 to 12 C-atoms, $R^{x'}$ and $R^{x''}$ are, independently of each other, H or alkyl with 1 to 12 C-atoms, or $OR^{x'}$ and $OR^{x''}$ together with the boron atom form a cyclic group having 2 to 10 C atoms R'' and R''' are, independently of each other, F, Cl, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by $-O-$, $-S-$, $-NH-$, $-NR^0-$, $-SiR^0R^{00}-$, $-CO-$, $-COO-$, $-OCO-$, $-OCO-O-$, $-S-CO-$, $-CO-S-$, $-CY^1=CY^2-$ or $-C\equiv C-$ in such a manner that O and/or S atoms are not linked directly to one another, or are P-Sp, $L^1$ and $L^2$ are independently of each other H or F, $R^0$ and $R^{00}$ are independently of each other H or alkyl with 1 to 12 C-atoms, and $Y^1$ and $Y^2$ are independently of each other H, F, Cl or CN, and the aromatic rings are optionally substituted with 1, 2 or 3 F, Cl, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by $-O-$, $-S-$, $-NH-$, $-NR^0-$, $-SiR^0R^{00}-$, $-CO-$, $-COO-$, $-COO-$, $-COO-O-$, $-S-CO-$, $-CO-S-$, $-CY^1=CY^2-$ or $-C\equiv C-$ in such a manner that O and/or S atoms are not linked directly to one another, or with P-Sp.

12. A polymer which has been obtained by polymerizing a compound of formula I1 according to claim 1 or a polymerizable LC material comprising at least one compound of formula I1 according to claim 1 and optionally at least one further compound, wherein at least one of said compounds is polymerizable.

13. An anisotropic polymer which has been obtained by polymerizing a compound of formula I1 according to claim 1 or a polymerizable LC material comprising a compound of formula I1 according to claim 1 in its oriented state in form of a film.

14. A semiconductor or charge transport material comprising at least one
    compound of formula I1 according to claim 1,
    polymerizable LC material comprising at least one compound of formula I1 according to claim 1 and optionally at least one further compound, wherein at least one of said compounds is polymerizable, or
    polymer which has been obtained by polymerizing a compound of formula I1 according to claim 1 or a polymerizable LC material comprising at least one compound of formula I1 according to claim 1 and optionally at least one further compound, wherein at least one of said compounds is polymerizable.

15. A light-emissive material comprising at least one compound of formula I1 according to claim 1,
    polymerizable LC material comprising at least one compound of formula I1 according to claim 1 and optionally at least one further compound, wherein at least one of said compounds is polymerizable, or
    polymer which has been obtained by polymerizing a compound of formula I1 according to claim 1 or a polymerizable LC material comprising at least one compound of formula I1 according to claim 1 and optionally at least one further compound, wherein at least one of said compounds is polymerizable.

16. An electrooptical display, LCD, eLCD, optical film, polarizer, compensator, beam splitter, reflective film, alignment layer, color filter, holographic element, hot stamping foil, colored image, decorative or security marking, consumer object, document of value, LC pigment, adhesive, synthetic resin with anisotropic mechanical properties, cosmetic product, pharmaceutical product, diagnostic product, nonlinear optical element, optical information storage device, a chiral dopant, an electronic device, OFET, a component of an integrated circuit (IC), thin film transistor (TFT) in a flat panel display, Radio Frequency Identification (RFID) tag, a semiconducting or light-emitting component of organic light emitting diode (OLED), electroluminescent display or backlight of an LCD, photovoltaic or sensor device, an electrode material in a battery, a photoconductor, or electrophotographic recording or alignment layer in an LCD or OLED device, comprising at least one compound of formula I1 according to claim 1, polymerizable LC material comprising at least one compound of formula I1 according to claim 1 and optionally at least one further compound, wherein at least one of said compounds is polymerizable, or polymer which has been obtained by polymerizing a compound of formula I1 according to claim 1 or a polymerizable LC material comprising at least one compound of formula I1 according to claim 1 and optionally at least one further compound, wherein at least one of said compounds is polymerizable, or a semiconductor or light-emitting material comprising at least one of said compound, polymerizable LC material or polymer.

17. A compound, which is of formulae I2c

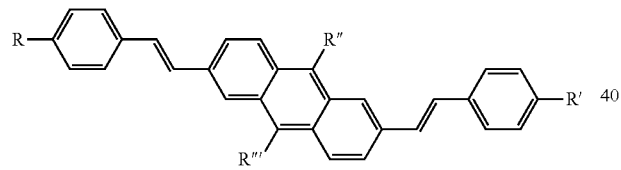

I2c wherein

R and R' are, independently of each other, F, Cl, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —COO—, —COO—O—, —S—CO—, —CO—S—, —$CY^1$=$CY^2$— or —C≡C— in such a manner that O and/or S atoms are not linked directly to one another, or are P-Sp, $B(OR^{x'})$ ($OR^{x''}$), $SnR^xR^{xx}R^{xxx}$ or $SiR^xR^{xx}R^{xxx}$, $R^x$, $R^{xx}$ and $R^{xxx}$ are, independently of each other, H, aryl or alkyl with 1 to 12 C-atoms, $R^{x'}$ and $R^{x''}$ are, independently of each other, H or alkyl with 1 to 12 C-atoms, or $OR^{x'}$ and $OR^{x''}$ together with the boron atom form a cyclic group having 2 to 10 C atoms R'' and R''' are, independently of each other, F, Cl, Br, I, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$CY^1$=$CY^2$— or —C≡C— in such a manner that O and/or S atoms are not linked directly to one another, or are P-Sp, $R^0$ and $R^{00}$ are independently of each other H or alkyl with 1 to 12 C-atoms, and $Y^1$ and $Y^2$ are independently of each other H, F, Cl or CN, and the aromatic rings are optionally substituted with 1, 2 or 3 F, Cl, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$CY^1$=$CY^2$— or —C≡C— in such a manner that O and/or S atoms are not linked directly to one another, or with P-Sp.

18. An LC medium or a polymerizable LC material comprising at least one compound comprising identical or different groups of formula I1

$$-[(G)_g-(A)_a]_z \qquad \text{I1}$$

wherein

G is, in case of multiple occurrence independently of one another,

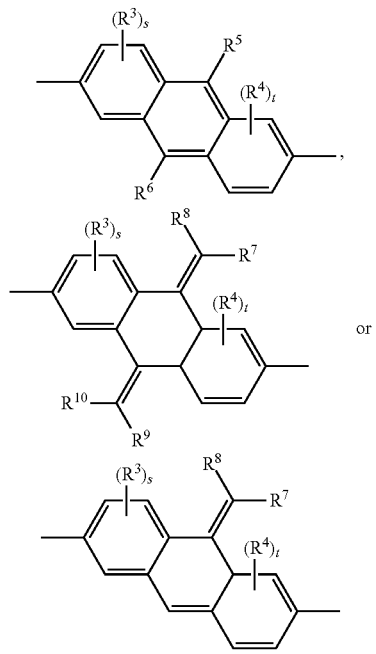

$R^3$ to $R^6$ are, independently of each other, F, Cl, Br, I, CN, $NO_2$, NCS, $SF_5$ or a straight chain or branched alkyl having 1 to 30 C-atoms that is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, CO—, —COO—, —OCO—, —OCO—O—, —S—CO—, —CO—S—, —$CY^1$=$CY^2$— or —C≡C— in such a manner that O and/or S atoms are not linked directly to one another, or are P-Sp, R[7] to R[10] are, independently of each other, F, Cl, Br, I, NO$_2$, NCS, SF$_5$ or a straight chain or branched alkyl having 1 to 30 C-atoms that is unsubstituted, mono- or polysubstituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, or are P-Sp, R$^0$ and R$^{00}$ are independently of each other H or alkyl with 1 to 12 C-atoms, P is a polymerizable or reactive group, Sp is a spacer group or a single bond, s and t are independently of each other 0, 1, 2 or 3, g is, in case of multiple occurrence independently of one another, 1, 2 or 3, A is, in case of multiple occurrence independently of one another, —CX$^1$=CX$^2$—, —C≡C—, an aromatic or alicyclic ring or a group comprising two or more fused aromatic or alicyclic rings, wherein these rings optionally contain one or more hetero atoms selected from the group consisting of N, O and S, and are optionally mono- or polysubstituted by R$^3$, X$^1$ and X$^2$ are independently of each other H, F, Cl or CN, Y$^1$ and Y$^2$ are independently of each other H, F, Cl or CN, a is, in case of multiple occurrence independently of one another, 0 or 1, and z is >1, wherein the groups [(G)$_g$-(A)$_a$] can be identical or different, and wherein the polymerizable LC material optionally comprises at least one further compound, wherein at least one of said compounds is polymerizable.

19. A polymer which has been obtained from a polymerizable LC material according to claim 18.

20. An anisotropic polymer which has been obtained from a polymerizable LC material according to claim 18 in its oriented state in form of a film.

21. A semiconductor or charge transport material, light-emissive material, electrooptical display, LCD, eLCD, optical film, polarizer, compensator, beam splitter, reflective film, alignment layer, color filter, holographic element, hot stamping foil, coloured image, decorative or security marking, consumer object, document of value, LC pigment, adhesive, synthetic resin with anisotropic mechanical properties, cosmetic product, pharmaceutical product, diagnostic product, nonlinear optical element, optical information storage device, electronic device, OFET, a component of integrated circuit (IC), thin film transistor (TFT) in a flat panel display, Radio Frequency Identification (RFID) tag, a semiconducting or light-emitting component of organic light emitting diode (OLED), electroluminescent display, backlight of an LCD, photovoltaic or sensor device, an electrode material in a battery, a photoconductor, electrophotographic device, electrophotographic recording device, comprising an LC medium or polymerizable material according to claim 18, or a polymer which has been obtained from a polymerizable LC material according to claim 18, or an anisotropic polymer which has been obtained from a polymerizable LC material according to claim 18 in its oriented state in form of a film.

22. A compound comprising one or more identical or different groups of formula I -(G)$_g$-    I wherein G is, in case of multiple occurrence independently of one another,

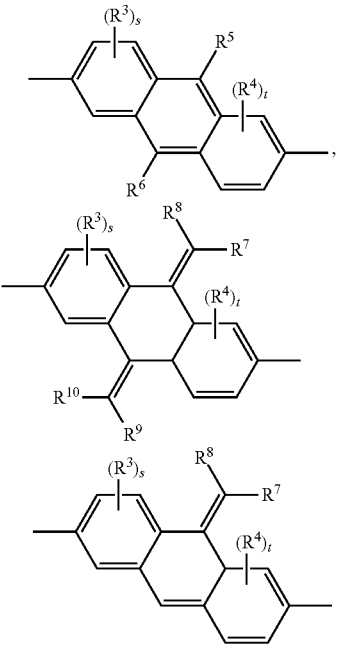

R$^3$ to R$^{10}$ are independently of each other F, Cl, Br, I, CN, NO$_2$, NCS, SF$_5$ or straight chain or branched alkyl having 1 to 30 C-atoms, which is unsubstituted, mono- or poly-substituted by F, Cl, Br, I or CN, and in which one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —CY$^1$=CY$^2$— or —C≡C— in such a manner that O and/or S atoms are not linked directly to one another, or P-Sp, R$^0$ and R$^{00}$ are independently of each other H or alkyl with 1 to 12 C-atoms, P is a polymerisable or reactive group, Sp is a spacer group or a single bond, s and t are independently of each other 0, 1, 2 or 3, g is, in case of multiple occurrence independently of one another, 1, 2 or 3, which contains at least one group P-Sp, and wherein P is CH$_2$=CW$^1$—COO—,

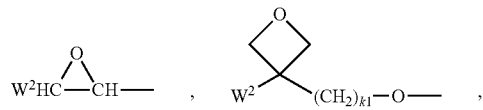

CH$_2$=CW$^2$—(O)$_{k1}$—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, HS—CW$^2$W$^3$—, CH$_2$=CW$^1$—CO—NH—, CH$_2$=CH—(COO)$_{k1}$-Phe-(O)$_{k2}$—, OCN—, or W$^4$W$^5$W$^6$Si—, with W$^1$ being H, Cl, CN, phenyl or alkyl with 1 to 5 C-atoms, W$^2$ and W$^3$ being independently of each other H or alkyl with 1 to 5 C-atoms, W$^4$, W$^5$ and W$^6$ being independently of each other Cl, oxaalkyl or oxacarbonylalkyl with 1 to 5 C-atoms, Phe being 1,4-phenylene and $k_1$ and $k_2$ being independently of each other 0 or 1.

23. A compound of claim 22, comprising one or more identical or different groups of formula I1

$$-[(G)_g-(A)_a]_z-\qquad\qquad I1$$

wherein

G is, in case of multiple occurrence independently of one another,

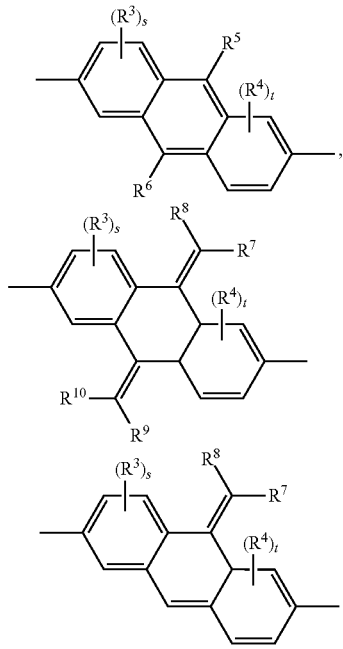

$R^3$ to $R^{10}$ are independently of each other F, Cl, Br, I, CN, $NO_2$, NCS, $SF_5$ or straight chain or branched alkyl having 1 to 30 C-atoms, which is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^o$—, —$SiR^oR^{oo}$—, —CO—, —COO—, —OCO—, —OCO—O—, —S—CO—, —CO—S—, —$CY^1$=$CY^2$— or —C≡C— in such a manner that O and/or S atoms are not linked directly to one another, or P-Sp, $R^o$ and $R^{oo}$ are independently of each other H or alkyl with 1 to 12 C-atoms, P is a polymerisable or reactive group, Sp is a spacer group or a single bond, s and t are independently of each other 0, 1, 2 or 3, g is, in case of multiple occurrence independently of one another, 1, 2 or 3, A is, in case of multiple occurrence independently of one another, —$CX^1$=$CX^2$—, —C≡C—, an aromatic or alicyclic ring or a group comprising two or more fused aromatic or alicyclic rings, wherein these rings optionally contain one or more hetero atoms selected from N, O and S, and are optionally mono- or polysubstituted by $R^3$, $X^1$ and $X^2$ are independently of each other H, F, Cl or CN, a is, in case of multiple occurrence independently of one another, 0 or 1, z is an integer 1, wherein in case of multiple occurrence the groups $[(G)_g-(A)_a]$ can be identical or different.

24. A compound of claim 22, which is of formula I1A $$R^1-[(G)_g-(A)_a]_z-R^2\qquad\qquad I1A$$

wherein

G is, in case of multiple occurrence independently of one another,

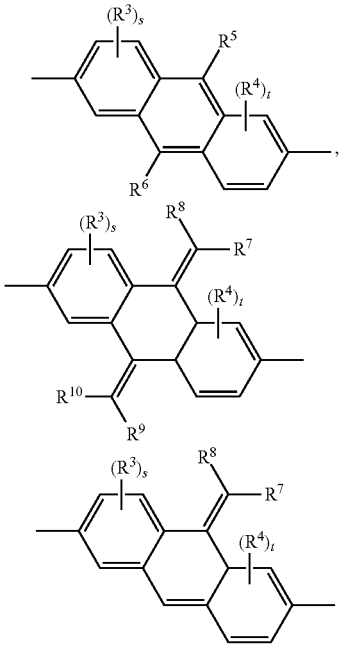

$R^3$ to $R^{10}$ are independently of each other F, Cl, Br, I, CN, $NO_2$, NCS, $SF_5$ or straight chain or branched alkyl having 1 to 30 C-atoms, which is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^o$—, —$SiR^oR^{oo}$—, —CO—, —COO—, —OCO—, —OCO—O—, —S—CO—, —CO—S—, —$CY^1$=$CY^2$— or —C≡C— in such a manner that O and/or S atoms are not linked directly to one another, or P-Sp, $R^o$ and $R^{oo}$ are independently of each other H or alkyl with 1 to 12 C-atoms, P is a polymerisable or reactive group, Sp is a spacer group or a single bond, s and t are independently of each other 0, 1, 2 or 3, g is, in case of multiple occurrence independently of one another, 1, 2 or 3, A is, in case of multiple occurrence independently of one another, —$CX^1$=$CX^2$—, —C≡C—, an aromatic or alicyclic ring or a group comprising two or more fused aromatic or alicyclic rings, wherein these rings optionally contain one or more hetero atoms selected from N, O and S, and are optionally mono- or polysubstituted by $R^3$, $X^1$ and $X^2$ are independently of each other H, F, Cl or CN, a is, in case of multiple occurrence independently of one another, 0 or 1, z is an integer ≥1, wherein in case of multiple occurrence the groups $[(G)_g-(A)_a]$ can be identical or different, $R^1$ and $R^2$ have independently of each other one of the meanings of $R^3$, or denote B(OR')(OR"), $SnR^oR^{oo}R^{ooo}$ or $SiR^oR^{oo}R^{ooo}$, $R^{0-000}$ are independently of each other H, aryl or alkyl with 1 to 12 C-atoms, R' and R" are independently of each other H or alkyl with 1 to 12 C-atoms, or OR' and OR" together with the boron atom may also form a cyclic group having 2 to 10 C atoms, and wherein one or both of $R^1$ and $R^2$ denote P-Sp or denote $B(OR')(OR")$, $SnR^0R^{00}R^{000}$ or $SiR^0R^{00}R^{000}$, wherein P is $CH_2=CW^1-COO-$,

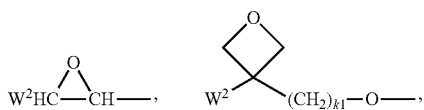

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $HS-CW^2W^3-$, $CH_2=CW^1-CO-NH-$, $CH_2=CH-(COO)_{k1}$-Phe-$(O)_{k2}-$, OCN—, or $W^4W^5W^6Si-$, with $W^1$ being H, Cl, CN, phenyl or alkyl with 1 to 5 C-atoms, $W^2$ and $W^3$ being independently of each other H or alkyl with 1 to 5 C-atoms, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

25. A compound of claim 22, which is of formula I2

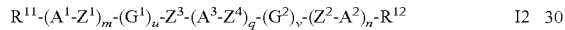    I2 wherein $G^1$ and $G^2$ have independently of each other and in case of multiple occurrence independently of one another,

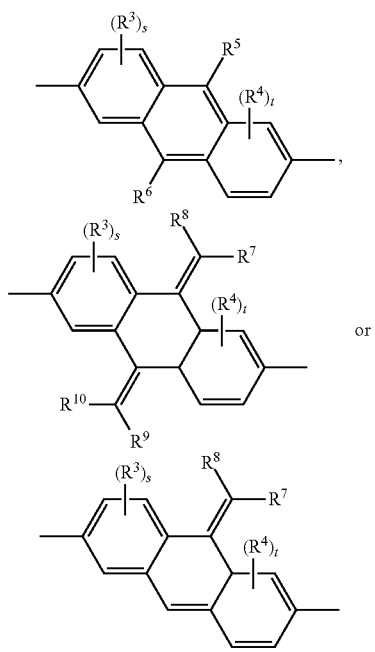

$R^3$ to $R^{10}$ are independently of each other F, Cl, Br, I, CN, $NO_2$, NCS, $SF_5$ or straight chain or branched alkyl having 1 to 30 C-atoms, which is unsubstituted, mono- or poly-substituted by F, Cl, Br, I or CN, and in which one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$CY^1=CY^2$— or —C≡C— in such a manner that O and/or S atoms are not linked directly to one another, or P-Sp, $R^0$ and $R^{00}$ are independently of each other H or alkyl with 1 to 12 C-atoms, P is a polymerisable or reactive group, Sp is a spacer group or a single bond, s and t are independently of each other 0, 1, 2 or 3, $R^{11}$ and $R^{12}$ have independently of each other one of the meanings of $R^3$, $A^1$ to $A^3$ are, independently of each other and in case of multiple occurrence of any of $A^1$ to $A^3$ each of such $A^1$ to $A^3$ independently of one another, —$CX^1=CX^2$—, —C≡C—, an aromatic or alicyclic ring or a group comprising two or more fused aromatic or alicyclic rings, wherein these rings optionally contain one or more hetero atoms selected from N, O and S, and are optionally mono- or polysubstituted by $R^3$, $Z^1$ to $Z^4$ are independently of each other —O—, —S—, —CO—, —COO—, —COO—, —S—CO—, —CO—S—, —O—COO—, —CO—$NR^0$—, —$NR^0$—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=N—, —N=CH—, —N=N—, —CH=$CR^0$—, —$CY^1=CY^2$—, —C≡C—, —CH=CH—COO—, —COO—CH=CH— or a single bond, $Y^1$ and $Y^2$ are independently of each other H, F, Cl or CN, m, n and q are independently of each other 0, 1, 2 or 3, u and v are independently of each other 0, 1 or 2, with u+v>0, and wherein one or both of $R^{11}$ and $R^{12}$ denote P-Sp, wherein P is $CH_2=CW^1-COO-$,

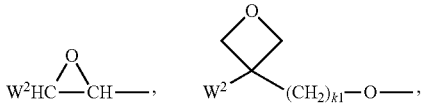

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $HS-CW^2W^3-$, $CH_2=CW^1-CO-NH-$, $CH_2=CH-(COO)_{k1}$-Phe-$(O)_{k2}-$, OCN—, or $W^4W^5W^6Si-$, with $W^1$ being H, Cl, CN, phenyl or alkyl with 1 to 5 C-atoms, $W^2$ and $W^3$ being independently of each other H or alkyl with 1 to 5 C-atoms, $W^4$, $W^5$ and $W^6$ being independently of each other Cl, oxaalkyl or oxacarbonylalkyl with 1 to 5 C-atoms, Phe being 1,4-phenylene and $k_1$ and $k_2$ being independently of each other 0 or 1.

26. A compound of claim 23, wherein z is 1.

27. A compound of claim 23, wherein z is from 2 to 5000.

28. A compound of claim 22, wherein P is a vinylether, propenylether or oxetane group or a group of formula $CH_2=CW^1-COO-$ or

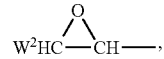

wherein $W^1$ is H, Cl, CN, phenyl or alkyl with 1 to 5 C-atoms, and $W^2$ is H or alkyl with 1 to 5 C-atoms.

29. A compound of claim 23, wherein A is, each independently, furane-2,5-diyl, thiophene-2,5-diyl, thienothiophene-2,5-diyl, dithienothiophene-2,6-diyl, pyrrol-2,5-diyl, 1,4-phenylene, azulene-2,6-diyl, pyridine-2,5-diyl, pyrimidine-2,5-diyl, naphthalene-2,6-diyl, 1,2,3,4-tetrahydro-naphthalene-2,6-diyl, indane-2,5-diyl, or 1,4-cyclohexylene, in which 1,4-cyclohexylene one or two non-adjacent $CH_2$ groups are optionally replaced by O and/or S, wherein these groups are unsubstituted, mono- or polysubstituted by $R^3$.

30. A polymerizable LC material comprising one or more compounds according to claim 22.

31. A polymer which has been obtained from a compound according to claim 22 or from a polymerizable LC material comprising a compound according to claim 22.

32. An anisotropic polymer which has been obtained from a compound according to claim 22 or from a polymerizable LC material comprising a compound according to claim 22 in its oriented state in form of a film.

33. A semiconductor or charge transport material, light-emissive material, electrooptical display, LCD, eLCD, optical film, polarizer, compensator, beam splitter, reflective film, alignment layer, color filter, holographic element, hot stamping foil, coloured image, decorative or security marking, consumer object, document of value, LC pigment, adhesive, synthetic resin with anisotropic mechanical properties, cosmetic product, pharmaceutical product, diagnostic product, nonlinear optical element, optical information storage device, electronic device, OFET, a component of integrated circuit (IC), thin film transistor (TFT) in a flat panel display, Radio Frequency Identification (RFID) tag, a semiconducting or light-emitting component of organic light emitting diode (OLED), electroluminescent display, backlight of an LCD, photovoltaic or sensor device, an electrode material in a battery, a photoconductor, electrophotographic device, electrophotographic recording device, comprising
    a compound according to claim 22, or
       a polymerizable LC material comprising one or more compounds according to claim 22, or
       a polymer which has been obtained from a compound according to claim 22 or from a polymerizable LC material comprising a compound according to claim 22, or
       an anisotropic polymer which has been obtained from a compound according to claim 22 or from a polymerizable LC material comprising a compound according to claim 22 in its oriented state in form of a film.

34. A polymer which has been obtained from a compound according to claim 2 or from a polymerizable LC material comprising a compound according to claim 2.

35. An anisotropic polymer which has been obtained from a compound according to claim 2 or from a polymerizable LC material comprising a compound according to claim 2 in its oriented state in form of a film.

36. A semiconductor or charge transport material, light-emissive material, electrooptical display, LCD, eLCD, optical film, polarizer, compensator, beam splitter, reflective film, alignment layer, color filter, holographic element, hot stamping foil, coloured image, decorative or security marking, consumer object, document of value, LC pigment, adhesive, synthetic resin with anisotropic mechanical properties, cosmetic product, pharmaceutical product, diagnostic product, nonlinear optical element, optical information storage device, electronic device, OFET, a component of integrated circuit (IC), thin film transistor (TFT) in a flat panel display, Radio Frequency Identification (RFID) tag, a semiconducting or light-emitting component of organic light emitting diode (OLED), electroluminescent display, backlight of an LCD, photovoltaic or sensor device, an electrode material in a battery, a photoconductor, electrophotographic device, electrophotographic recording device, comprising
    a compound according to claim 2, or
    a polymerizable LC material comprising one or more compounds according to claim 2, or
    a polymer which has been obtained from a compound according to claim 2 or from a polymerizable LC material comprising a compound according to claim 2, or
    an anisotropic polymer which has been obtained from a compound according to claim 2 or from a polymerizable LC material comprising a compound according to claim 2 in its oriented state in form of a film.

* * * * *

UNITED STATES PATENT AND TRADEMARK OFFICE
CERTIFICATE OF CORRECTION

PATENT NO. : 7,998,540 B2  
APPLICATION NO. : 10/563759  
DATED : August 16, 2011  
INVENTOR(S) : Goulding et al.

Page 1 of 1

It is certified that error appears in the above-identified patent and that said Letters Patent is hereby corrected as shown below:

Column 42, Line 62 reads: "-COO-, -COO-, -COO-O-, -S-CO-," should read -- -COO-, -OCO-, -OCO-O-, -S-CO- --.

Column 49, Line 52 reads: "(OR$^{x''}$), SnR$^{x}$R$^{xx}$R$^{xxx}$ or SiR$^{x}$R$^{xx}$R$_{xxx}$," should read -- "(OR$^{x''}$), SnR$^{x}$R$^{xx}$R$^{xxx}$ or SiR$^{x}$R$^{xx}$R$^{xxx}$, --.

Column 50, Line 27 reads: "-COO-, -COO-, -COO-O-, -S-CO-, -CO-" should read -- -COO-, -OCO-, -OCO-O-, -S-CO-, -CO- --.

Column 51, Line 52 reads: "-CO-, -COO-, -COO-, -COO-O-," should read -- -CO-, -COO-, -OCO-, -OCO-O-, --.

Column 55, Line 65 reads: "z is an integer 1," should read -- z is an integer $\geq 1$, --.

Column 58, Line 22 reads: "-CO-, -COO-, -COO-, -S-CO-, -CO-" should read -- -CO-, -COO-, -OCO-, -S-CO-, -CO- --.

Column 58, Line 29 reads: "-CH=CH-COO-, -COO-CH=CH- or a" should read -- -CH=CH-COO-, -OCO-CH=CH- or a --.

Signed and Sealed this  
Twentieth Day of December, 2011

David J. Kappos  
*Director of the United States Patent and Trademark Office*